US008620354B2

(12) United States Patent
Beasley

(10) Patent No.: US 8,620,354 B2
(45) Date of Patent: Dec. 31, 2013

(54) METHOD AND SYSTEM FOR SELECTIVELY LIMITING WIRELESS COMMUNICATION IN A MOTOR VEHICLE

(76) Inventor: Richard K. Beasley, Southlake, TX (US)

( * ) Notice: Subject to any disclaimer, the term of this patent is extended or adjusted under 35 U.S.C. 154(b) by 224 days.

(21) Appl. No.: 12/956,707

(22) Filed: Nov. 30, 2010

(65) Prior Publication Data

US 2011/0136476 A1 Jun. 9, 2011

Related U.S. Application Data

(60) Provisional application No. 61/266,359, filed on Dec. 3, 2009, provisional application No. 61/292,647, filed on Jan. 6, 2010.

(51) Int. Cl.
*H04W 24/00* (2009.01)
(52) U.S. Cl.
USPC ............... 455/456.4; 455/41.2; 455/569.2
(58) Field of Classification Search
USPC .................... 455/456.4, 41.2, 569.2
See application file for complete search history.

(56) References Cited

U.S. PATENT DOCUMENTS

2004/0056779 A1* 3/2004 Rast ........................ 340/985
2007/0222588 A1* 9/2007 Wolfe ...................... 340/539.13
2008/0319666 A1* 12/2008 Petrov et al. .................. 701/213
2010/0120437 A1* 5/2010 Foster et al. .................. 455/444
2011/0053506 A1* 3/2011 Lemke et al. ................ 455/41.2
2011/0092159 A1* 4/2011 Park et al. .................... 455/41.2
2011/0105097 A1* 5/2011 Tadayon et al. .............. 455/418
2011/0183658 A1* 7/2011 Zellner ........................ 455/418
2012/0058593 A1* 3/2012 Lin et al. ....................... 438/73
2012/0089423 A1* 4/2012 Tamir et al. ...................... 705/4

* cited by examiner

*Primary Examiner* — Barry Taylor
(74) *Attorney, Agent, or Firm* — Eschweiler & Associates, LLC

(57) ABSTRACT

The present invention relates to a communication system that selectively limits functionality of one or more portable electronic communication devices. More particularly, in one embodiment the apparatus for selectively limiting functionality may comprise a transmission device comprising a transmitter configured to transmit an activation signal to an activation radius. The transmission device may further comprise one or more motion sensors configured to provide power from a battery to the transmission device upon physically detecting activity (e.g., motion, vibration) of a vehicle. The activation signal allows the transmission device to communicate with a plurality of portable electronic communication devices that detects a condition of the portable electronic communication devices and that execute a control software application that limits functionality if the detected condition violates the predetermined safety condition and if the activation signal indicates that the portable electronic communication device should have a limited functionality.

18 Claims, 15 Drawing Sheets

METHOD AND SYSTEM FOR SELECTIVELY LIMITING WIRELESS COMMUNICATION IN A MOTOR VEHICLE

RELATED APPLICATIONS

This application claims priority to U.S. Provisional Application Ser. No. 61/266,359 filed Dec. 3, 2009, entitled "METHOD AND SYSTEM FOR SELECTIVELY LIMITING WIRELESS COMMUNICATION IN A MOTOR VEHICLE" and U.S. Provisional Application Ser. No. 61/292,647 filed Jan. 6, 2010, entitled "METHOD AND SYSTEM FOR SELECTIVELY LIMITING WIRELESS COMMUNICATION IN A MOTOR VEHICLE."

BACKGROUND

Portable electronic communication devices (e.g., cellular phones) allow a person to communicate to a wireless network as they travel between various geographical locations. Over the past two decades, portable electronic devices have had an enormous impact on the world, facilitating communication by a user at nearly anytime and anyplace.

In recent years, portable electronic communication devices have been developed that offer a wide range of functionalities. In addition to voice based communication, portable electronic communication device may be used to provide data communication comprising text messaging, accessing the World Wide Web, digital television broadcasts, etc. In upcoming years, new functionality will likely emerge in next generation mobile phones.

DETAILED DESCRIPTION OF THE INVENTION

Figure 1:
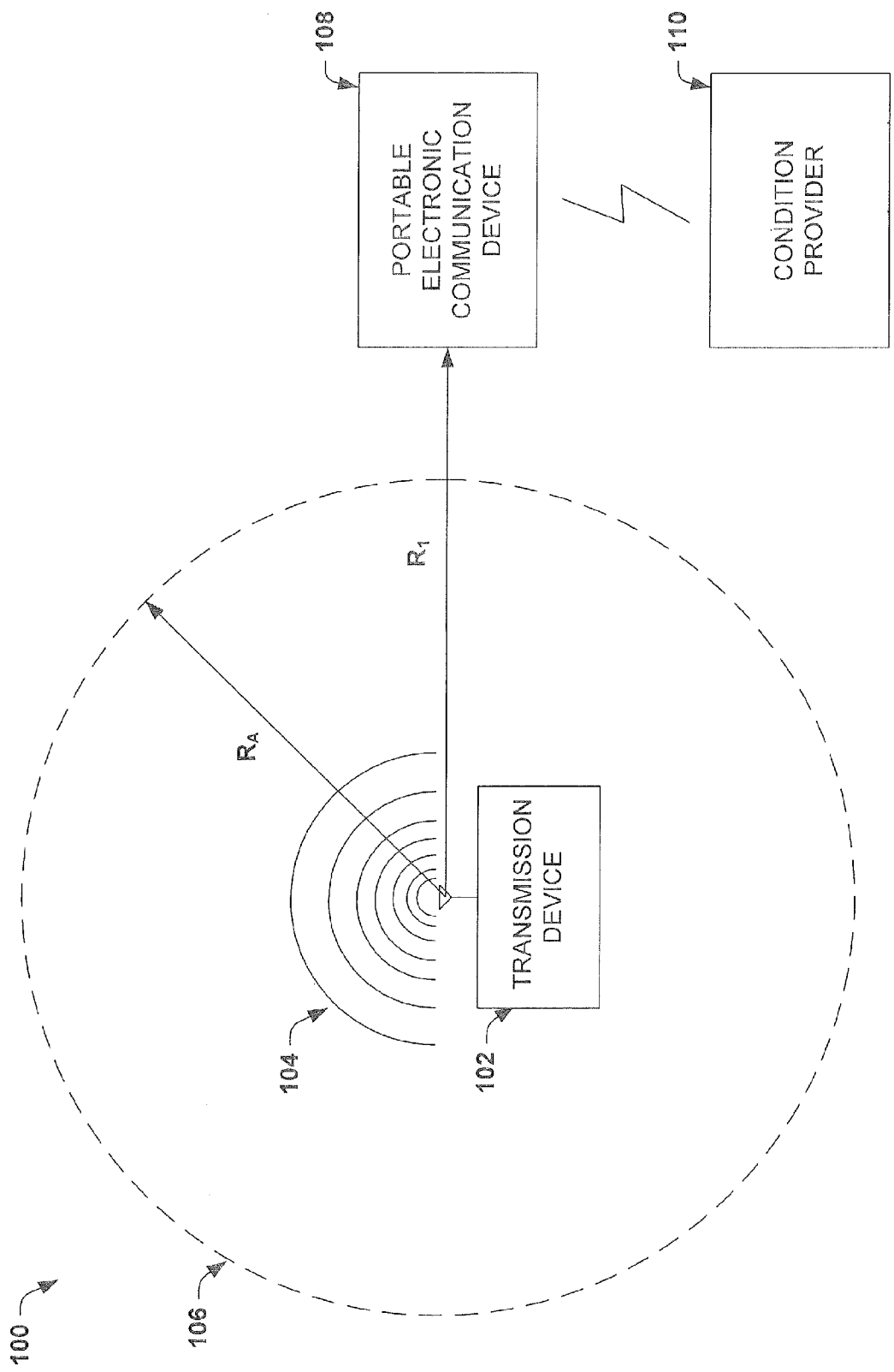
FIG. 1 illustrates a block diagram of a communication system configured to selectively limit functionality of one or more portable electronic communication devices located within a predefined spatial boundary.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

The past decade has seen a proliferation of portable electronic communication devices throughout the world. Cellular telephones have become a nearly indispensible part of our lives that allow us to communicate with family, friends, business associates, etc., at nearly anytime and anyplace. Unfortunately, as portable electronic communication devices have become more common the inherent danger of irresponsible operation of such devices has become a safety risk for society. Of particular safety concern is the operation of motor vehicles (e.g., automobiles, trains, planes, etc.) while using a portable electronic communication device (e.g., a cellular telephone). In response, many state and local governments have passed legislation limiting the use of portable electronic devices while operating motor vehicles.

Although new laws may slightly decrease operation of portable electronic communication devices, such laws are difficult to enforce and commonly ignored by drivers. Therefore, some companies have begun to sell software applications that disable text messaging while a portable electronic communication device is in motion. The inventor has appreciated that these software applications do not adequately distinguish between movement that puts a user at increased risk of harm (e.g., movement while driving an automobile) and movement that does not put a user at an increased risk of harm (e.g., movement while riding as a passenger in a train). Therefore, such applications are overly restrictive and unacceptable to a large portion of the population.

Accordingly, the present invention relates to method and apparatus that selectively limits functionality of one or more portable electronic communication devices (e.g., belonging to vehicle operators but not vehicle passengers). In other words, the present invention relates to a transmission device configured to communicate with one or more portable electronic communication devices via an activation signal that selectively limits the functionality of a subset of the one or more portable electronic communication devices if certain conditions are met (e.g., movement of device, location of device, proximity of device with respect to transmitter, identification of device's owner, etc.), without limiting the functionality of the remaining one or more portable electronic communication devices.

More particularly, in one embodiment the apparatus for selectively limiting functionality may comprise a transmission device comprising a transmitter (e.g., a transmitter chain of a transceiver) configured to transmit an activation signal to an activation radius. The transmission device may further comprise device configured to provide power from a battery to the transmission device upon physically detecting activity (e.g., motion, vibration, etc.) of a vehicle. The activation signal allows the transmission device to communicate with a portable electronic communication device that detects a condition of the portable electronic communication device and that executes a control software application that limits functionality if the detected condition violates the predetermined safety condition and if the activation signal indicates that the portable electronic communication device should have a limited functionality.

It will be appreciated that the method and apparatus for limiting portable electronic communication device functionality as provided herein may be implemented in various ways, as will be described more fully below. For example, in one embodiment (shown in FIGS. 1-4), the activation signal may indicate that portable electronic communication devices that violate the predetermined safety condition and that are within the activation radius should have a limited functionality. In an alternative embodiment (shown in FIGS. 5-6), the activation signal may indicate that portable electronic communication devices that violate the predetermined safety condition and that are within the activation radius may have a limited functionality if they are identified as a vehicle operator (e.g., driver) and may further indicate that portable electronic communication devices that violate the predetermined safety condition and that are within the activation radius may not have a limited functionality if they are not identified as the vehicle operator.

FIG. 1 illustrates a block diagram of a first embodiment of a communication system 100 having a transmission device configured to selectively limit (e.g., disabled) the functionality (e.g., text messaging) of one or more portable electronic communication devices (e.g., cellular phones) that are located within a predefined spatial boundary 106 and that violate a safety condition (e.g., are traveling faster than 10 M.P.H.). In particular, the communication system 100, provided herein, comprises a transmission device 102 (e.g., a transmitter, transceiver) that provides an activation signal and a portable electronic communication device 108, which operates a control software application that limits functionality if the device violates a predetermined safety condition and is within the activation radius.

The transmission device 102 is configured to transmit an activation signal 104 over a certain distance (e.g., 2 meters), illustrated as activation radius $R_A$. The activation radius $R_A$ therefore defines a spatial boundary, or communication limiting "cocoon" 106, inside of which the functionality of a portable electronic communication device 108 may be limited (e.g., disabled) if a predetermined safety condition of the portable electronic communication device is violated (e.g., the velocity of the portable electronic communication device is greater than 10 m.p.h.).

FIG. 1 further illustrates a condition provider 110. The condition provider 110 is configured to provide a condition of the portable electronic communication device 108. In one embodiment, the condition may comprise the velocity of the portable electronic communication device 108 (e.g., limiting functionality above a velocity greater than 10 m.p.h.). In an alternative embodiment, the condition may comprise the location of the portable electronic communication device 108 (e.g., limiting functionality in active school zones).

A control software application run on the portable electronic communication device 108 is configured to limit functionality of the portable electronic communication device 108 based upon a detection of the activation signal 104 and a condition of the device. For example, if the device 108 determines that it is within the spatial boundary 106 and the condition of the device violates a predetermined safety condition, the control software application (e.g., running on portable electronic communication device 108) may limit functionality of the portable electronic communication device 108 (e.g., if an electronic device is in a spatial boundary defining the driver's seat and traveling greater than 10 miles per hour, functionality can be disabled). Alternatively, if the electronic device determines that it is either not within the spatial boundary $R_A$ or that the condition of the device does not violate a predetermined safety condition, then the control software application will not limit functionality of the portable electronic communication device 108. As illustrated in FIG. 1, the portable electronic communication device 108 is at a distance $R_1$ (i.e., which is greater than RA) from the transmission device 102 and therefore, since it is outside of the spatial boundary 106, the functionality of the communication device 108 is not limited regardless of whether or not a condition of the device violate a predetermined safety condition.

It will be appreciated that the term 'radius' (e.g., activation radius), as used herein, is not limited to a constant radius. Instead radius may be understood to refer to a distance, from the transmission device. The radius may comprise a substantially uniform distance in all direction or it may comprise varying distances in different directions. For example, the activation radius may extend at 0° to a distance of 1 meter, and at 90° to a distance of 1.2 meters. Accordingly, the term radius, as provided herein, is not limiting to the shape or strength of the activation signals field.

Figure 2:
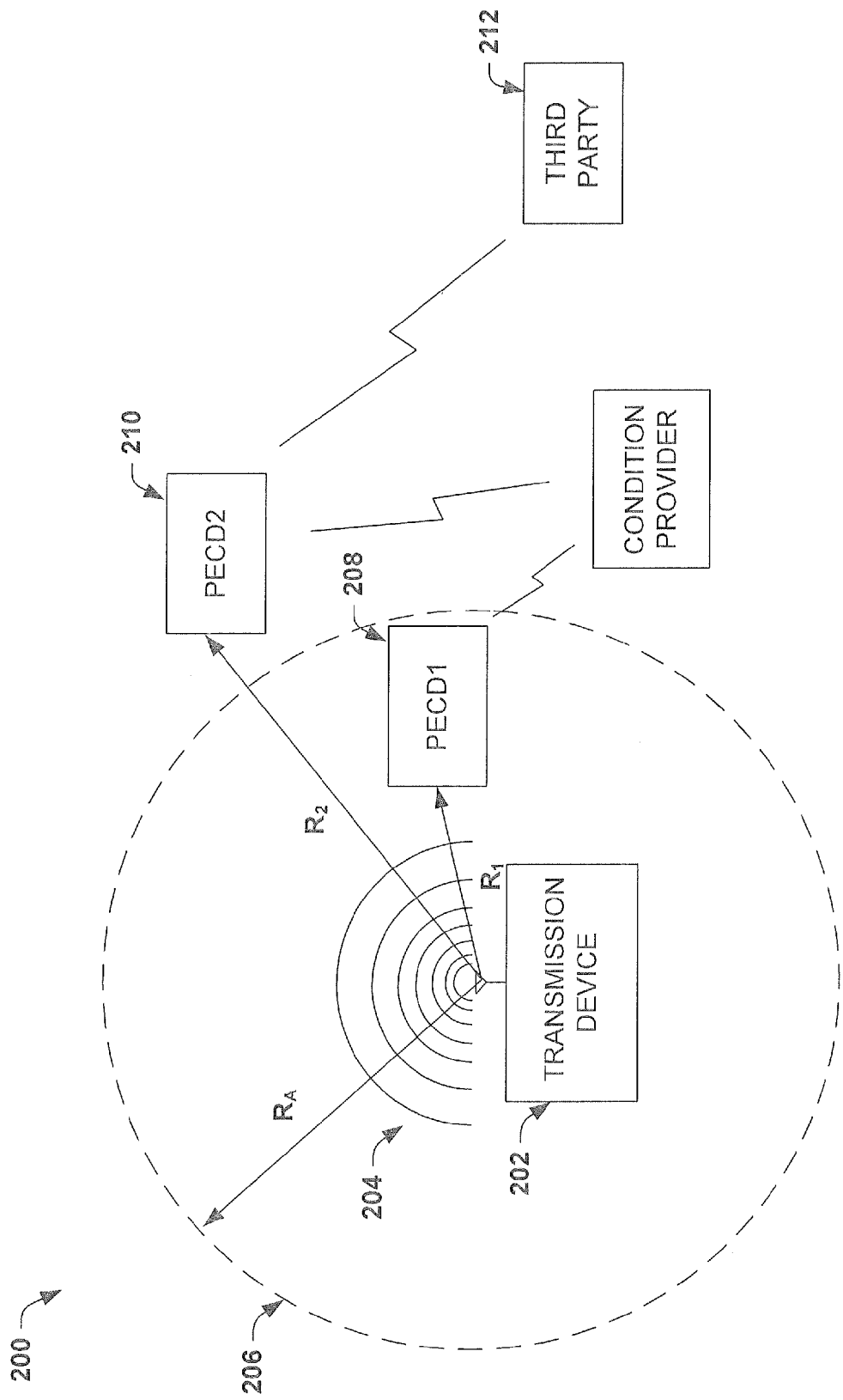
FIG. 2 illustrates a block diagram of two portable electronic communication devices within the communication system illustrated in FIG. 1.

FIG. 2 illustrates an additional embodiment of a block diagram illustrating two portable electronic communication devices, 208 and 210, within a communication system 200 configured to selectively limit functionality. The activation signal 204 is configured to have a field strength that allows one or more portable electronic communication devices located within the spatial boundary 206, defined by the activation radius $R_A$, to recognize reception of the activation signal 204. Portable electronic communication devices outside of the spatial boundary 206 will not recognize reception of the activation signal and therefore will not have limited functionality.

For example, as illustrated in FIG. 2, portable electronic communication device (PECD1) 208 is located at a radius $R_1$ away from the transmission device 202 (e.g., a transmitter, transceiver). Since $R_1$ is less than the activation radius $R_A$, portable electronic communication device 208 recognizes reception of the activation signal 204 and accordingly, the functionality of portable electronic communication device 208 can be disabled if a condition of the device 208 violates a predetermined safety condition. Portable electronic communication device 2 (PECD2) 210 is located at a radius $R_2$ away from the transmission device 202. Since $R_2$ is greater than the activation radius $R_A$, portable electronic communication device 210 does not recognize reception of the activation signal 204 and accordingly, the functionality of portable electronic communication device 210 may not be disabled even if a condition of the device 210 violates a predetermined safety condition. In FIG. 2, portable electronic communication device 210 is shown communicating with a third party 212 while portable communication device 208, located within spatial boundary 206, is prevented from communicating with the third party 212.

Figure 3A:
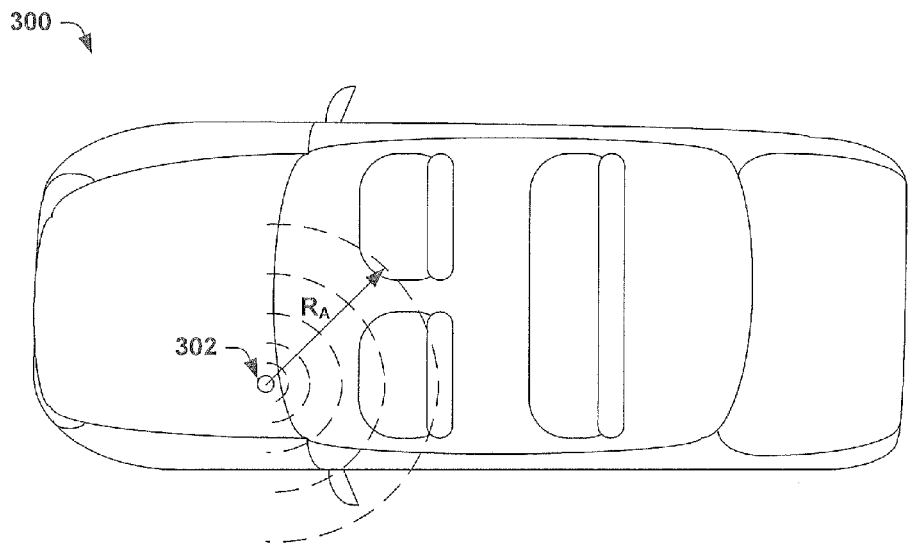
FIG. 3A illustrates an exemplary embodiment of a communication device disposed within an automobile, wherein the activation signal is configured to have an activation radius which limit functionality of selected portable electronic communication devices within the automobile.

In some embodiments, the activation radius $R_A$ of the spatial boundary can be selectively chosen to disable functionality for some people within a motor vehicle (e.g., a train engineer), while allowing full functionality for other people within the same motor vehicle (e.g., a train passenger). For example, FIG. 3a illustrates an automobile 300 having a transmission device 302, configured to transmit an activation signal, located in a position that limits transmission of the activation signal to a spatial boundary including the driver but not passengers of the automobile (i.e., having an activation radius $R_A$). As illustrated in FIG. 3a, the use of the activation radius $R_A$ permits limiting a functionality of a driver's portable electronic communication device when the automobile is in motion, while allowing full functionality of a passenger's portable electronic communication devices. In various embodiments, the transmission device may be placed on the dashboard, steering wheel, windshield, etc.

It will be appreciated that the activation radius $R_A$ may be adjusted to provide for a smaller or larger spatial boundary (e.g., and therefore to allow more or less people within a motor vehicle to operate their portable electronic communication devices). Furthermore, it will also be appreciated that the transmission device described herein may also be utilized with a wide range of motor vehicles comprising cars, trucks, planes, trains, boats, etc. in a manner similar to that shown in FIG. 3a. For example, a transmitter (e.g., an RFID transmitter, a Bluetooth transmitter, a zigbee transmission module, etc.) could be located on a train to limit functionality for an engineer's portable electronic communication device while allowing passengers full functionality.

Figure 3B:
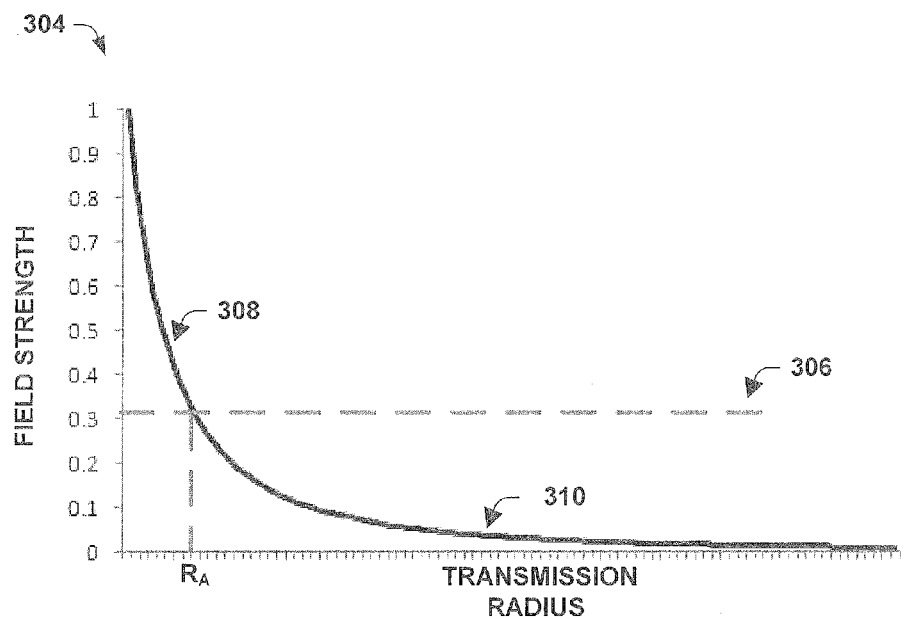
FIG. 3b is a graph illustrating an exemplary activation signal strength provided by the transmission device.

FIG. 3b is an exemplary graph 304 illustrating the field strength of the activation signal provided by a transmission device. The field strength (y-axis) will decrease as a function of the distance from the transmission device (x-axis). In one embodiment, when the field strength of the activation signal is greater than a predefined threshold 306 (e.g., within a distance RA of the transmission device), the portable electronic communication device will consider the activation signal received (illustrated as region 308). Alternatively, when the field strength of the activation signal is smaller than the predefined threshold 306 (e.g., at a distance greater than RA from the transmission device), the portable electronic communication device will not consider the activation signal received (illustrated as region 310).

It will be appreciated that the field strength may vary in different directions. For example, the field strength at 0° may differ from the field strength at 30° or 140°. Therefore, communication devices in different locations of a vehicle may experience different field strengths and therefore different activations radii. This phenomenon may lead to multiple devices receiving an activation signal. Accordingly, a transmission device may be further configured to regulate a number of portable electronic communication devices that have functionality limited by an activation signal. For example, if a plurality of cell phones are located within an activation radius of a transmission device, the transmission device may be configured to limit the functionality of a subset the plurality of cell phones located in the activation radius (e.g., a single cell phone, two cell phones, etc.).

It will be appreciated that the, that the inventor has contemplated a transmission device comprising one or more of various transmission devices and that the transmission devices described herein are not intended to limit the scope of the invention. For example, in one embodiment, the transmission device may comprise a radio-frequency identification (RFID) sticker (e.g., attached to an automobile windshield using an adhesive material) or an RFID tag. In an alternative embodiment, the transmission device may comprise a Bluetooth transmitter (e.g., attached to an automobile windshield or steering wheel). As described herein a Bluetooth transmitter may comprise, a normal power Bluetooth transmitter, a low-power (i.e., low-energy) Bluetooth transmitter, or an ultra low-power Bluetooth transmitter. In yet another alternative embodiment, the transmission device may comprise a zigbee transmission module operating according to the zigbee specification (e.g., utilizing IEEE standard 802.15.4-2003). A zigbee transmission module would provide for low-cost, low-power, wireless communication.

Figure 4A:
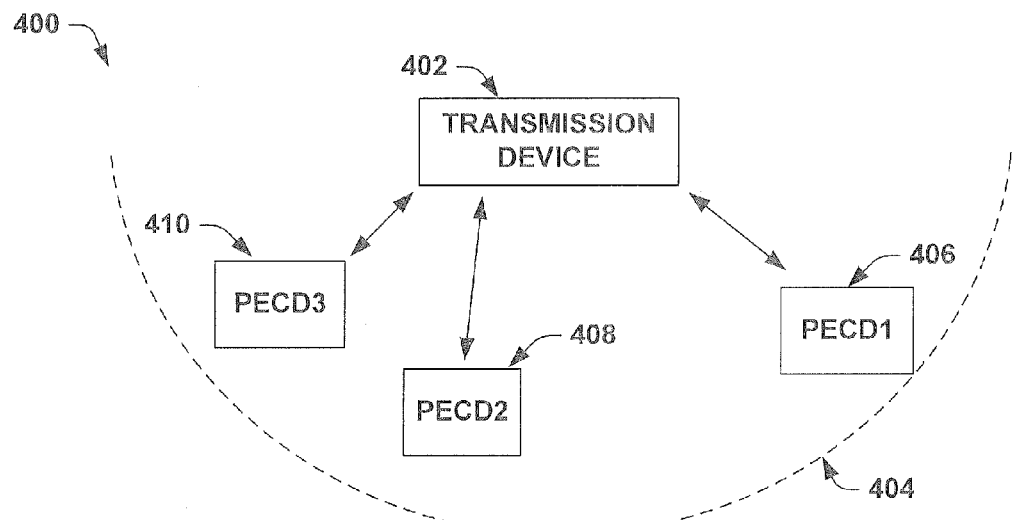
FIG. 4a illustrates a one to multiple pairing between a transmission device and a plurality of portable electronic communication devices.
Figure 4B:
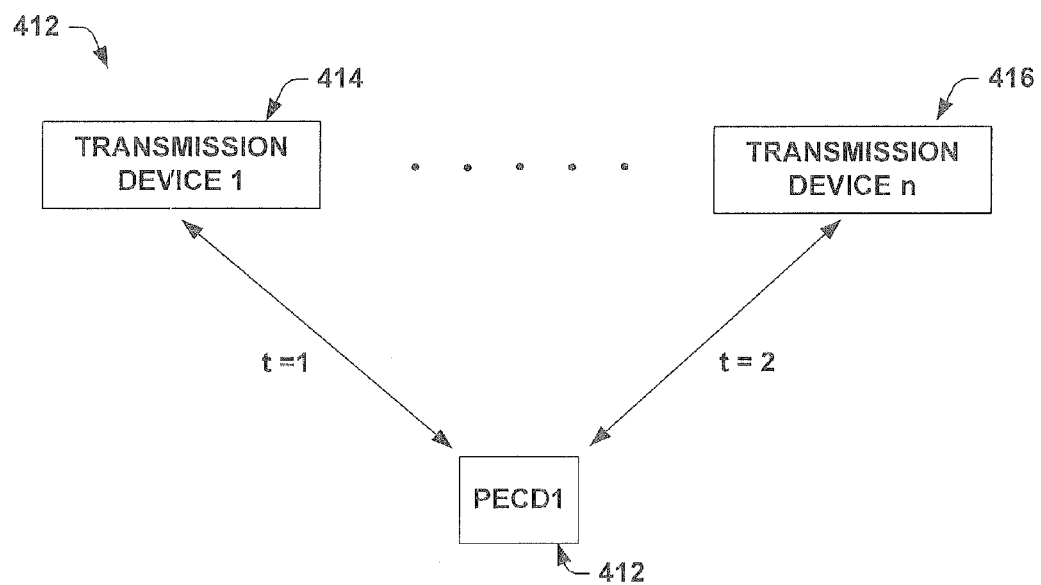
FIG. 4b illustrates a one to multiple pairing between a portable electronic communication device and a plurality of transmission devices.
Figure 5:
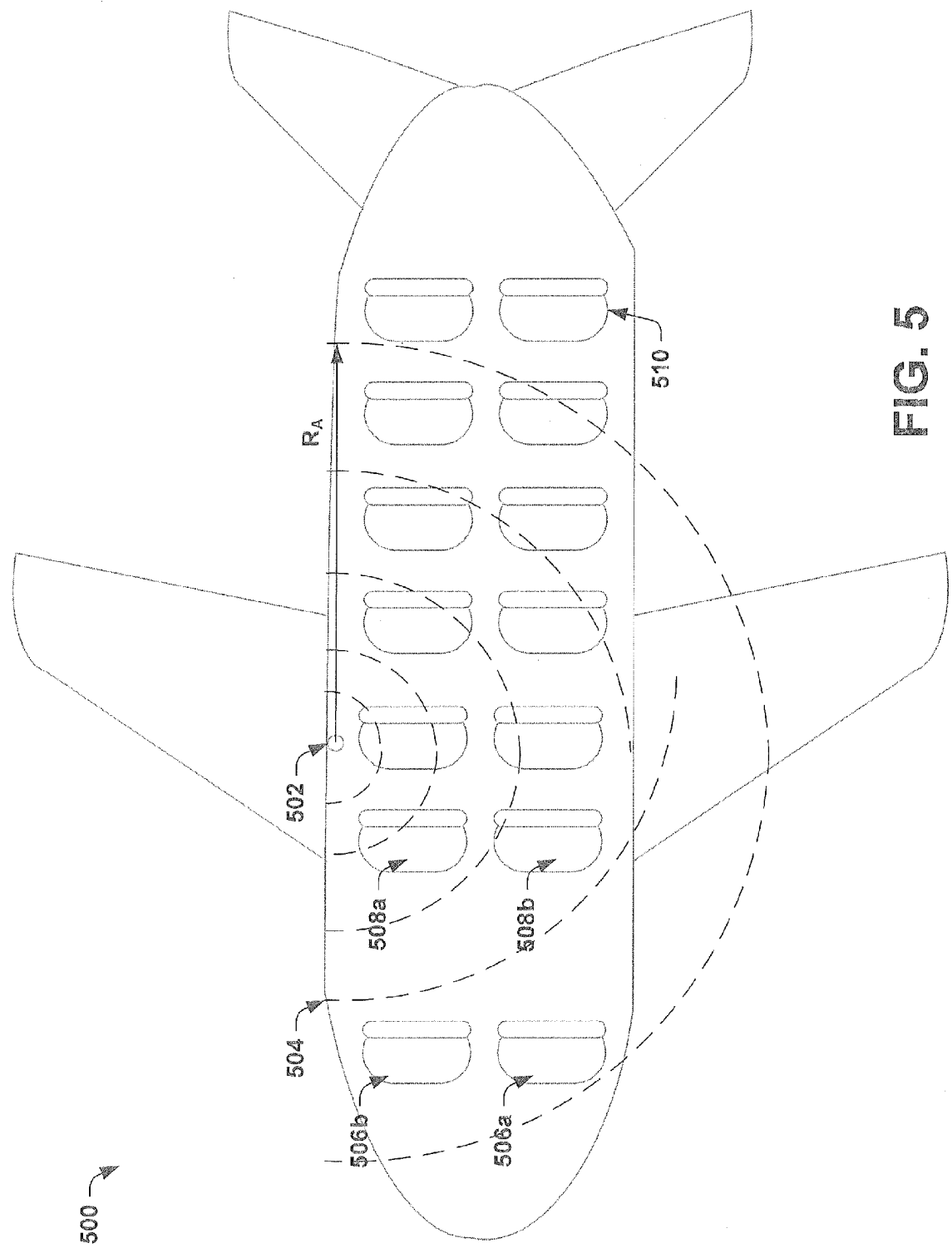
FIG. 5 illustrates an exemplary embodiment of a communication device disposed within an automobile, wherein the activation signal is configured to selectively limit functionality of portable electronic communication devices tagged as vehicle operator within an activation radius, while allowing functionality of portable electronic communication devices tagged as vehicle passengers.
Figure 6A:
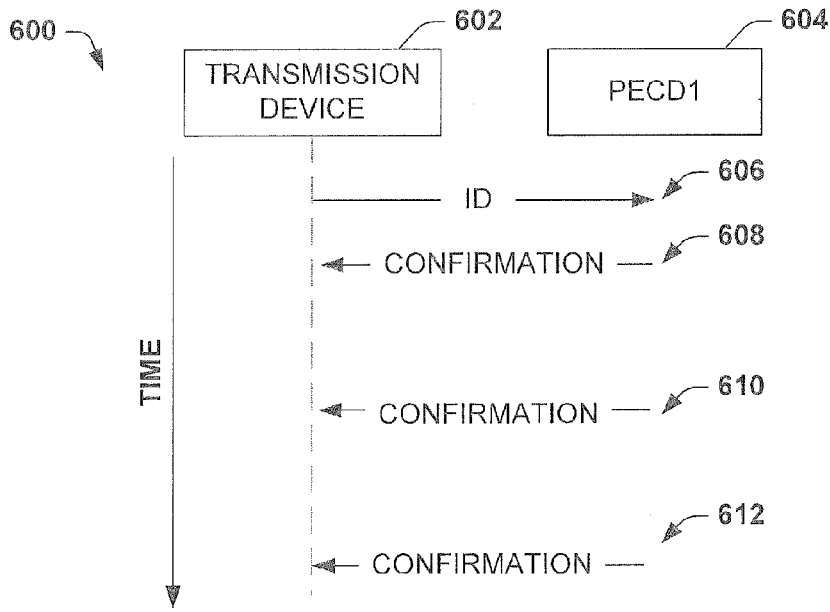
FIG. 6a illustrates a transmission diagram showing signals transmitted between elements of a communication system, as provided herein, comprising a single portable electronic communication device located within an activation radius of a transmission system.
Figure 6B:
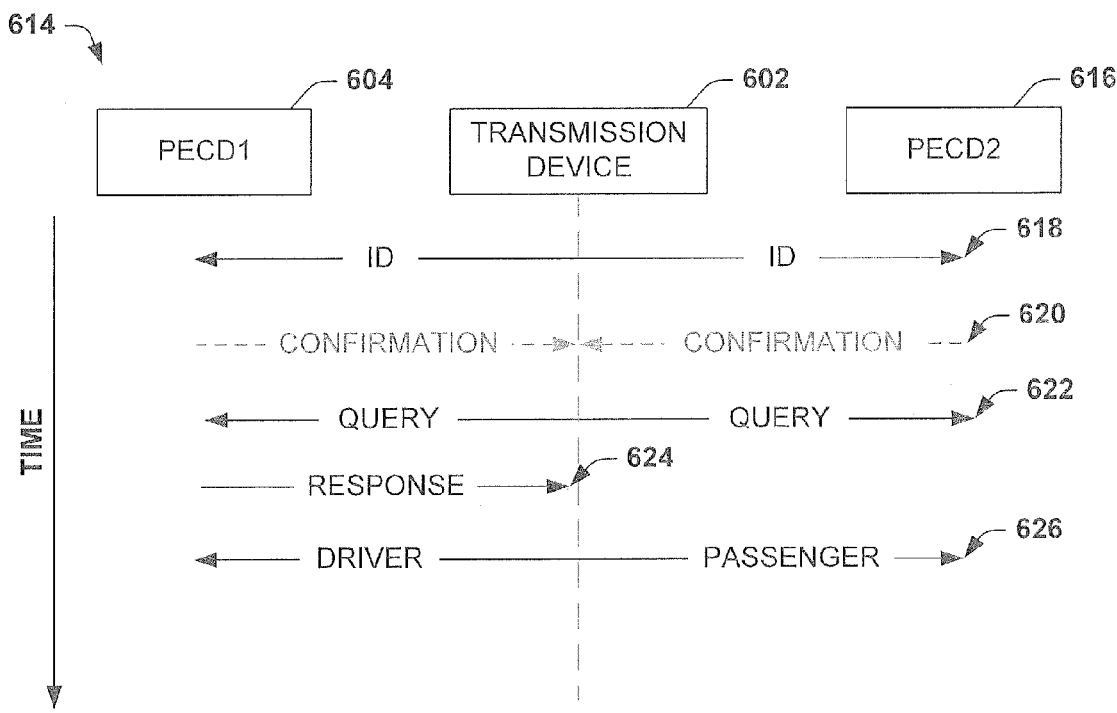
FIG. 6b illustrates a transmission diagram showing signals transmitted between elements of a communication system, as provided herein, comprising two portable electronic communication devices located within an activation radius of a transmission system.

FIGS. 4a-6b illustrates additional embodiments of the present invention wherein the limitation of functionality may be determined by additional considerations or different considerations than those shown in FIGS. 1-4. For example, in some embodiments, a portable electronic communication device may not have a limited functionality without one or more conditions being met in addition to receiving a signal from a transmission device and violating a predetermined safety condition. For example, in one embodiment when multiple portable communication devices are located within an activation radius, as shown in FIGS. 5-6b infra, the functionality of some portable electronic communication devices within an activation radius (e.g., tagged as a driver) may be limited without limiting the functionality of others (e.g., passengers).

In one embodiment, shown in FIG. 4a, a transmission device as provided herein is not a limited to a one to one pairing with portable electronic communication devices, but may have a one to multiple pairing. In other words, a transmission device may be paired with multiple cell phones (e.g., drivers). FIG. 4a illustrates a block diagram 400 of a transmission device 402 enabled to generate a pairing with a plurality of portable electronic communication devices 406, 408, 410. As shown in FIG. 4a the transmission device 402 may communication with multiple (e.g., 5, 10, etc.) portable electronic communication devices (e.g., 406, 408, 410) located within the activation radius 404. The transmission device 402 may determine that the vehicle has more than one operator (e.g., a plane) and may limit the functionality of multiple portable electronic communication devices (e.g., 406 and 410).

Furthermore, as shown in FIG. 4b, a portable electronic communication device is not limited to a one to one pairing with transmission devices, but may have a one to multiple pairing. In other words, a portable electronic communication device may be paired with multiple transmission devices (e.g., cars). FIG. 4a illustrates a block diagram 400 of a portable electronic communication device enabled to generate a pairing with a plurality of transmission devices 414 and 416. As shown in the block diagram 412 of FIG. 4b, the portable electronic communication device may communication with multiple (e.g., 5, 10, etc.) transmission devices 414 and 416 located in different vehicles that the operator may be operating (e.g., a delivery driver may have a portable electronic communication device that is paired with transmission devices in a plurality of trucks owned by the delivery business).

Therefore as shown in FIGS. 4a and 4b, one transmission device can communicate with a plurality of portable electronic communication devices within an activation radius and one portable electronic communication device can communicate with a plurality of transmission devices.

In one particular embodiment, shown in FIG. 5, the functionality of portable electronic communication devices comprised within a vehicle 500 are selectively limited based upon a pairing between the transmission device 502 and the portable electronic communication devices. In such an embodiment, limitation of a portable electronic communication device functionality may be selectively limited by the transmission device 502 transmitting an activation signal that specifically identifies a driver's portable electronic communication device (e.g., as being different from that of passengers). In other words, the activation signal is configured to selectively limit functionality of portable electronic communication devices tagged as vehicle operator within an activation radius, while allowing functionality of portable electronic communication devices tagged as vehicle passengers within the activation radius.

For example, the activation signal 504 may limit the functionality of portable electronic communication devices 506a and 506b that violate the predetermined safety condition and that are paired with the transmission device (e.g., identified by the activation signal as pilots). Furthermore, portable electronic communication devices 510 that violate the predetermined safety condition and that do not receive the activation signal may have limited functionality. However, the activation signal 504 may allow full functionality for portable electronic communication devices 508a and 508b that violate the predetermined safety condition but that are not paired with the transmission device (e.g., are not identified by the activation signal as a pilot).

In one embodiment, the pairing is generated by an exchange of signals between the portable electronic communication device and transmission device that indicate which portable electronic communication device should have limited functionality (e.g., which cell phone is a vehicle driver). For example, in one embodiment, wherein the field strength of the activation signal provides an activation signal over an entire vehicle (e.g., $R_A$ is larger than the vehicle size), the activation signal may initially cause multiple portable electronic communication devices having a control software program on them to have their functionalities limited. The portable electronic communication devices will subsequently interact with the transmission device to determine one or more pairings of portable electronic communication devices which should have their functionality limited (e.g., the driver's portable electronic communication device). Once the one or more pairings are established other portable electronic communication devices, within an activation radius, may retain full functionality.

FIG. 6a illustrates one example of transmission diagram 600 showing signals transmitted between elements of a communication system, as provided herein, comprising a single portable electronic communication device 604 located within an activation radius of a transmission device 602. The transmission device 602 will output an activation signal 606 comprising an ID, which is received by the single portable electronic communication device 604 (PECD1). In one embodiment, the portable electronic communication device 604 (PECD1) retains the ID as an identifier of the transmission device in a memory so that it can identify signals received from the transmission device 602. If a predetermined safety condition is violated, a control software program run on PECD1 604 may limit functionality of the portable electronic communication device upon receipt of the activation signal 606 and will cause PECD1 604 to respond to the activation signal 606 with a confirmation signal 608, which identifies PECD1 as the operator of the vehicle (e.g., as a driver). Therefore, as shown in FIG. 6a, for a single portable electronic communication device within an activation radius, a pairing may be formed by a portable electronic communication device receiving an activation signal 606 and returning a confirmation signal 608.

FIG. 6b shows one example of a communication system 614 comprising two portable electronic communication devices 604 (PECD1) and 616 (PECD2) located within an activation radius of a transmission device 602. The two portable electronic communication devices 604 and 616 located within the activation signal radius will receive an activation signal 618, having an ID, from the transmission device 602 and will retain an identifier of the device. Each portable electronic communication device control software program will cause a respective portable electronic communication device to respond to the transmission device with a confirmation signal 620. If a transmission device receives a confirmation signal 620 from two or more portable electronic communication devices it is unable to determine which portable electronic communication device is the driver's. Accordingly, it may send a query 622 to portable electronic communication devices 604 and 616 asking the each portable electronic communication device to identify who the driver is (e.g., it may send a message to each cell phone asking "are you the driver?").

Until at least one of the portable electronic communication devices responds to the query 622, and identifies the driver, the functionality of the portable electronic communication devices that have received the activation signal remain limited (e.g., disabled). In other words, before a driver is declared, the functionality may be disabled for portable electronic communication devices within the activation radius. However, when either portable electronic communication device sends a response 624 to the query, and identifies the driver, the transmission signal can send an updated signal 626 which limits the functionality of one of the two portable electronic communication devices (e.g., PECD1 identified as a driver), while restoring full functionality to the other portable electronic communication device (e.g., PECD2 identified as a passenger).

It will be appreciated that although FIG. 6b illustrates a communication system 614 comprising two portable electronic communication devices 604 and 616 located within an activation radius of a transmission device, that the method and apparatus provided herein may be applied to systems comprising any number of portable electronic communication devices. For example, the system shown in FIG. 6b could also comprise more than two portable communication devices (e.g., three devices, four devices, 100 devices, etc.).

In one embodiment, once a pairing is established (i.e., when a first portable electronic device PECD1 is identified as a driver with the transmission device) a second portable electronic communication device can enter and exit the activation radius without affecting the pairing of the first portable electronic communication device and the transmission device. For example, if a driver having a first portable electronic communication device paired with a transmission device, picks up another person having a second portable electronic communication device, the other person's second portable electronic communication device can see the transmission device and confirm that device's first communication device is paired with it, without affecting the pairing.

In one embodiment, the transceiver may be configured to accumulate data of portable electronic communication device identifiers to further assist in identifying a vehicle operator In one embodiment, if a person operates a vehicle having a transmission device provided herein alone for a number of consecutive days the transmission device may automatically assume that the person is the operator when the person enters the vehicle with multiple people thereafter. For example, if a husband drives their car to work for five days out of the week and then enters the car over the weekend with his wife, the transmission device sees two people, but assumes that the husband that normally gets drives is the driver. Alternatively, if wife gets in car without the husband the transmission device sees one person and assumes they are the driver.

Referring again to FIG. 6a, in such an embodiment, wherein a driver consistently uses the same vehicle, (e.g., and therefore the same transmission device) after a predetermined number of consecutive confirmation signals 608, 610, 612 are received by the transmission device 602, it will determine that portable electronic communication device 604 is the vehicle driver. In such an embodiment, the discovery process (e.g., 606 and 608) may be bypassed (e.g., using less power) and the portable electronic communication device may be automatically tagged as being the driver upon entering the vehicle. In one embodiment, confirmations received when multiple phones are in the car (e.g., FIG. 6b) may count towards the predetermined number of consecutive confirmation signals. Such an embodiment would not prevent the discovery process from being performed when new devices enter the vehicle.

Therefore, when a plurality of portable electronic communication devices are present running the control software program a subset of the plurality of portable electronic communication devices may have limited functionality. For example, in a mass transit vehicle (e.g., a train) the vehicle operator may be identified as the driver thereby allowing passenger portable electronic communication devices with the control software to not have a limited functionality.

In one embodiment, if a portable electronic communication device detects more than one transmission device (e.g., in heavy traffic), it may assume that the transmission device it has been in connection with for the longest time period is the one it is associated with and will ignore the other transmission devices.

Figure 7A:
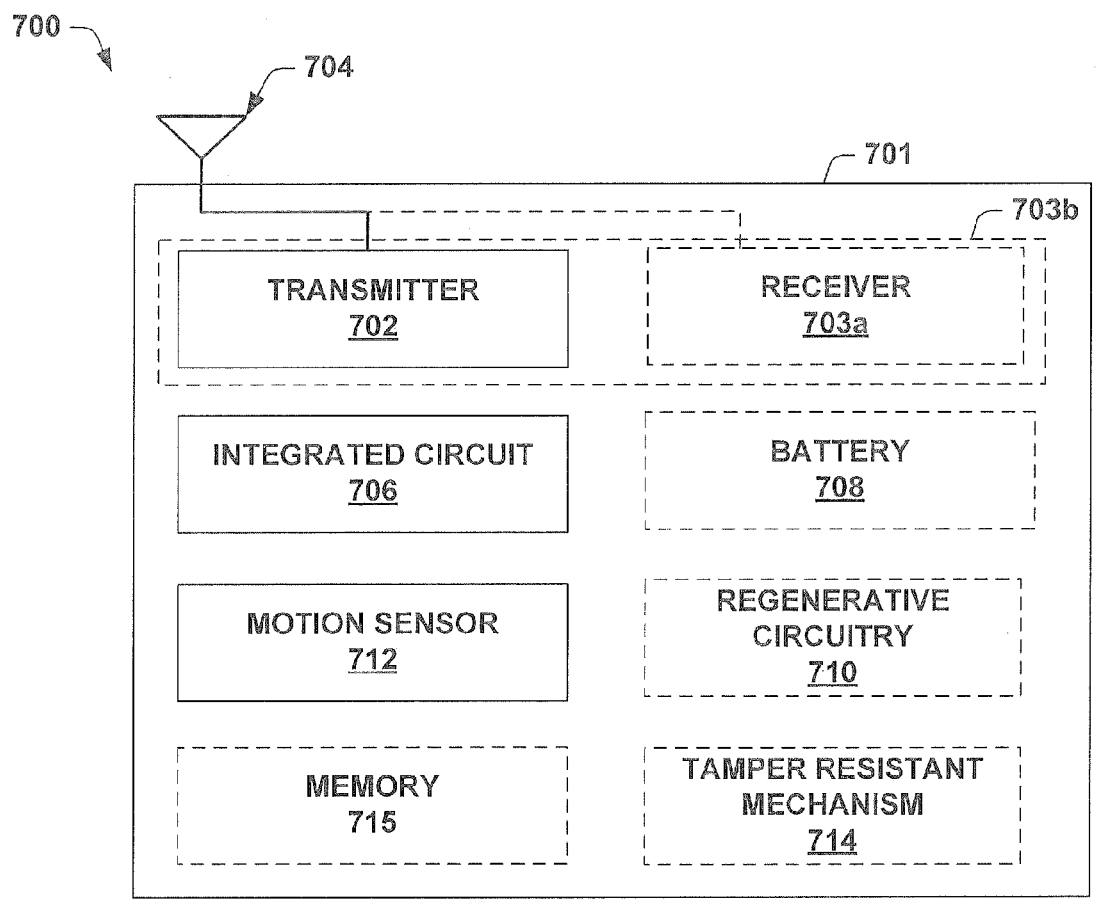
FIG. 7a illustrates a block diagram of a transmission device as provided herein.

FIG. 7a illustrates one embodiment of a transmission device 700 as provided herein. The transmission device comprises a housing 701 configured to comprise a transceiver 702 (e.g., a transmitter chain of a transceiver). As shown in FIG. 7a, the transceiver 702 is configured to emit an activation signal, which can be received by portable electronic devices within an activation radius, by way of an antenna 704 (e.g., an internal antenna, an external antenna). The transmission device 700 further comprises an integrated circuit 706, coupled to the transmitter 702. The integrated circuit 706 may be configured to store information, to process information, and to modulate and demodulate a radio-frequency (RF) signal. In one embodiment, the integrated circuit is configured to encode outgoing RF signals with an identification code.

The transmission device 700 may comprise a battery 708 configured to provide power to the integrated circuit 706 and to the transmitter 702. The battery 708 may be configured to have a power supply that substantially lasts a particular lifetime (e.g., and therefore to transmit an activation signal for a substantially predetermined period of time). In one embodiment, the transmission device may comprise one or more motion sensor(s) 710 configured to sense physical activity (e.g., motion, vibration) of the transmission device 700 and to provide power from the battery 708 to the transmitter 702. For example, when an automobile is started, the motion sensor(s) 710 may detect the vibration of the automobile and provide power from the battery 708 to the transmitter 702, to transmit an activation signal (via antenna 704).

In an alternative embodiment, the transmitter 702 may comprise a receiver component 703a configured to send or receive radio frequency signals from antenna 704 (e.g., configured to receive two or more confirmation signals from two or more portable electronic communication devices that are within the activation radius as described in FIG. 5b). In yet another alternative embodiment the transmitter 702 and receiver 703a may be comprised within a transceiver 703b configured to send or receive radio frequency signals from antenna 704. In one embodiment the transceiver may be configured to provide power to the RFID system by receiving an external power signal. For example, the integrated circuit 706, of FIG. 7, may be powered through a power signal provided to antenna 704 (e.g., from a portable electronic communication device having an RFID transmission device) through an RFID transceiver (e.g., replacing transmitter 702) and the battery 708 may be omitted.

Figure 7B:
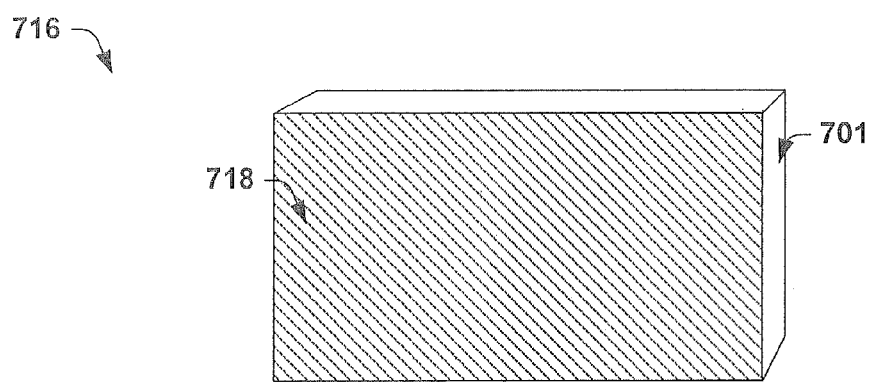
FIG. 7b illustrates a schematic diagram of a transmission device as provided herein, particularly illustrating an adhesive surface.

In one embodiment, the transmission device may comprise a RFID sticker or an RFID tag. As shown in FIG. 7b, the housing of the transmission device may comprise an adhesive surface 718 having a tacky surface that allows for the tag to be affixed to a surface of a vehicle. For example, the adhesive surface may allow the housing of the transmission device to be affixed to a windshield of an automobile. As described herein, the term adhesive surface is meant to mean a surface having at least some portion (e.g., less than 100% of a surface of the tag, but not necessarily 100%) comprising an adhesive substance.

Various power saving features may be incorporated onto the transmission device 700. These power saving features may allow a transmission system to operate for extended periods of time using a single battery (e.g., a Bluetooth transmission system may operate for 14-18 months based on an average daily use of 6 hrs/day). The power savings features allow for battery powered transmission devices to extend their life by reducing the power consumption of the transmission device.

In one embodiment, the transmission device 700 may be configured to implement a power saving mode, wherein the transmission device 700 uses less than full power. In one embodiment, a power save mode the transmission device may enter a power saving mode turns on and (e.g., turn off) based upon movement of the device as sensed by motion sensors 710. For example, in one embodiment the motion sensors may comprise an accelerometer configured to detect vibrations. When the accelerometer detects a vibration (e.g., from opening a car door, starting the car, etc.), it operates a switching mechanism to provide power from the battery 708 to the transmitter (e.g., Bluetooth transmitter chip) 702.

In one embodiment the transmission device 700 is configured to enter a discovery mode upon receiving power from a charge storage device (battery). During the discovery mode (e.g., 502 and 504 in FIG. 5; 602 and 604 in FIG. 6) the transmission device 700 outputs an activation signal. If it receives sends a confirmation then the transmission device 700 knows that a portable electronic communication device is in range and enters an operating mode. If it does not receive a response then it will end the discovery mode (e.g., transmitting an activation signal) after a predetermined period of time (e.g., 5 s). The use of a discovery mode prevents inadvertent vibrations (e.g., earthquakes) from draining the battery power of the transmission device.

In one embodiment, wherein the transmission device 700 is configured to accumulate data consisting of portable electronic communication device identifiers to assist in identifying a vehicle operator, the transmission device may be comprise a memory 715 configured to accumulate the data. The memory may also be configured to store other data.

In one embodiment, the transmission device 700 may be configured to power down if the motion sensors 710 do not detect movement for a predetermined period of time. For example, if the motion sensors 710 fail to detect activity/movement (e.g., vibration, motion, etc.) of the vehicle for 5 minutes, the transmission system may enter an energy saving mode wherein one or more components of the transmission system are powered down.

In another embodiment, the transmission device 700 may comprise an energy regenerative circuitry 712 that enables an energy regeneration capability in the transmission device 700. The energy regenerative circuitry 712 may be configured to generate energy from one or more external sources (e.g., solar power, thermal energy, kinetic energy, etc.) that may be used to charge the battery 708 or the other parts of the transmission device (e.g., transmitter 702, antenna 704, integrated circuit 706) directly. In various embodiments, the energy regenerative circuitry 712 may comprise an electromagnetic energy harvesting circuit, a piezoelectric energy harvesting circuit, or an RFID transceiver, for example.

In one particular embodiment, the regenerative circuitry 710 may be configured to generate power from solar energy. For example, the regenerative circuitry 710 may comprise a photovoltaic cell/panel that is coupled to the transmission device 700, as provided herein, to provide power to the transmission device. For example, if the transmission device comprises an adhesive material which allows it to be attached to a car window, the photovoltaic panel may be located in a position that allows it to generate electricity by receiving sunlight. Alternatively, the regenerative circuitry 710 may comprise a thin film solar cell (e.g., a solar ink product that generates energy) located on the surface of the transmission device. It will be appreciated that the inventor has contemplated that a transmission device having a photovoltaic power source may take on a variety of shapes, sizes, forms, etc. (e.g., adhesive stickers, hanging tags, etc.) which allow it to receive sunlight.

In one embodiment, the transmitter 702 may comprise a Bluetooth transmitter (e.g., a normal power Bluetooth transmitter, a low-power (i.e., low-energy) Bluetooth transmitter, or an ultra low-power Bluetooth transmitter). The Bluetooth transmitter (e.g., utilizing a wireless protocol for exchanging data over short distances using short length radio waves) could be easily configured to interact Bluetooth components presenting existing in most modern portable electronic communication devices. For example, a cell phone or PDA configured to receive a Bluetooth wireless protocol for a hands free communication device (e.g., a Bluetooth headset) could be configured to receive an activation signal using the same Bluetooth wireless protocol. Such an embodiment would allow for reception of an activation signal by most third generation portable electronic device without using any additional hardware components. In yet an alternative embodiment, the transmission device may comprise a zigbee transmission module configured to transmit a wireless signal (e.g., an RF signal) according to a zigbee specification. Such an embodiment would provide for a low-cost, low-power, wireless transmission device. In yet another alternative embodiment, the transmission device may comprise one or more of an RFID transmitter, a Bluetooth transmitter, and/or a Zigbee transmission module.

In one embodiment, wherein the transmission device is configured to regulate a number of portable electronic communication devices that have functionality limited by an activation signal (e.g., limit functionality of a subset a plurality of cell phones located in an activation radius), a transmission device may comprise a transceiver (not shown) configured to output an activation signal and to receive a confirmation signal from portable electronic communication devices that have received the activation signal. From received confirmation signals, the transmission device will determine the number of portable electronic communication devices that have received the activation signal. If the number of portable electronic communication devices receiving the action signal is greater than a certain threshold (e.g., 1) then the transmission device will further communicate with the devices to limit the functionality of a subset the portable electronic communication devices within the activation radius For example, if a transmission device receives a confirmation signal from two or more cell phones then it may send a query (e.g., via a Bluetooth transceiver, an RFID transceiver, a zigbee radio transceiver) to the two or more cell phones asking each phone to identify who the driver is (e.g., it may send a text message to each cell phone asking "are you the driver?"). Until at least one of the cell phones responds to the query, and identifies the driver, the functionality of the two or more cell phones that have received the activation signal remain limited (e.g., disabled). However, when either cell phone responds to the query, and identifies the driver, the functionality of one of the two cell phones is limited, and full functionality of the other cell phone(s) is restored.

The transmission device 700 may comprise tamper resistance mechanisms 716 that prevent the transmission device from being tampered with. The tamper resistance mechanisms 716 may comprise a wide range of mechanisms that may be configured to sense when a transmission device is tamped with according to various conditions of the transmission device.

Figure 7C:
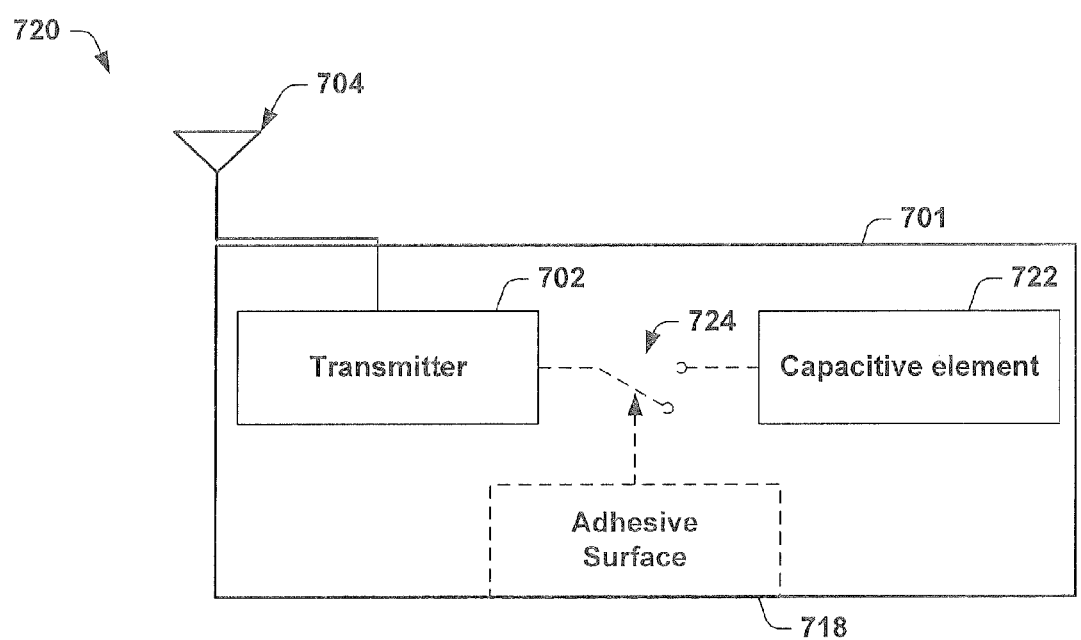
FIG. 7c illustrates a block diagram of a transmission device as provided herein, particularly illustrating a capacitive tampering component.

For example, in one embodiment (shown in FIG. 7c), wherein a transmission device 720 is affixed to a vehicle surface, the transmission device 720 may comprise a capacitive component 722 that is configured to discharge a current when the transmission device 720 is removed from the surface. In one embodiment, as shown in FIG. 7c, capacitor 722 may discharge a current to the transmitter indicating tampering has occurred when a switch 724 is closed through distress to the adhesive surface 718). In an alternative embodiment, the capacitors discharged current may trigger a sensor that detects tampering with the transmission device. In another embodiment, wherein a transmission device comprises a motion sensor (e.g., FIG. 7a), the transmission device may detect distress when excessive amount of activity/movement is sensed.

In one embodiment, when tampering is sensed, a message (e.g., text message, email message, voice message, etc.) may be sent from the portable electronic communication device paired with the tampered device to a managing authority to alert the managing authority that the transmission device has been tampered with.

Figure 8:
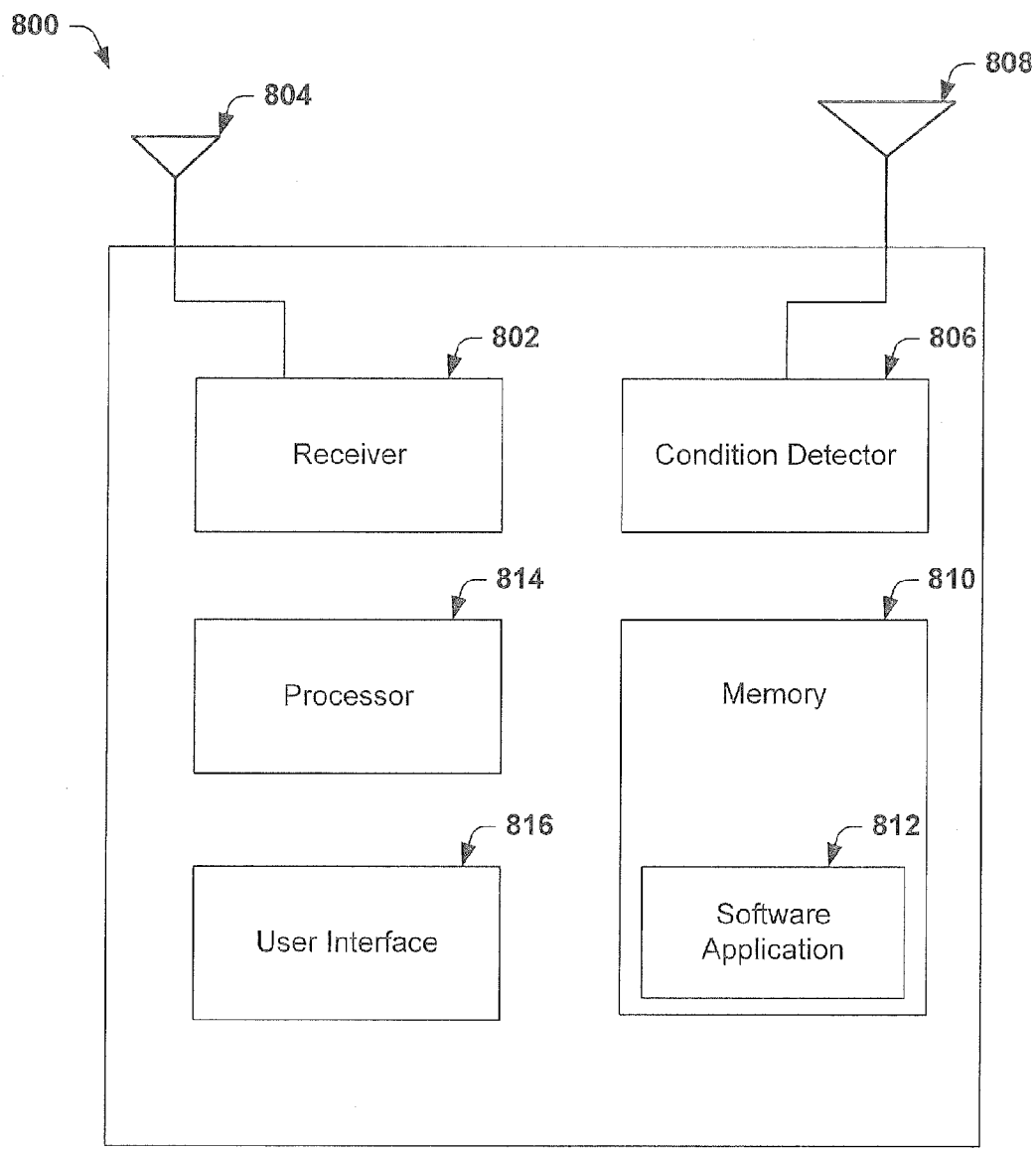
FIG. 8 illustrates a block diagram of a portable electronic communication device as provided herein.

FIG. 8 illustrates one embodiment of a portable electronic communication device 800, as provided herein. In one embodiment, the portable electronic communication device may comprise a cellular phone or a personal digital assistant (PDA). As shown in FIG. 8, the portable electronic communication device 800 comprises a receiver 802, configured to receive an activation signal provided by a transmission device (e.g., as illustrated in FIG. 7) using an antenna 804. In one embodiment, the receiver 802 comprises an RFID circuit located within a cellular phone/PDA. The RFID circuit may be placed cellular phone/PDA by a manufacturer of the device or may be added to the cellular phone as an additional chip component (e.g., within the battery compartment of a cellular phone).

The portable electronic communication device 800 also comprises a condition detector 806 configured to detect conditions (e.g., speed, velocity, etc.) of the portable electronic communication device from an outside source (e.g., GPS satellites, cell phone tower, etc.). The condition detector 806 may be attached to an antenna 808 configured to communicate with a condition provide (e.g., GPS satellite). In one embodiment antenna 808 and 804 may comprise the same antenna. The portable electronic communication device 800 may further comprise a user interface 816 that allows a user to interface with the portable electronic communication device. In various embodiments the user interface 816 may comprise a graphical interface and a keyboard, or a touch screen graphical interface.

A memory element 810 is configured to store a control software application 812. The software application 812 may be accessed from the memory element 810 and run on a processor 814. The software application 812 may work with a transmission device to selectively limit the functionality of portable electronic communication devices running it. In one embodiment, the software application 812 is configured to utilize inputs from the receiver 802 and the condition detector 806 and to selectively limit functionality of the portable electronic communication device 800.

For example, in one embodiment (e.g., described in FIGS. 1-4), if the software application 812 determines that portable electronic communication device 800 has received an activation signal from a transmission device (e.g., as illustrated in FIG. 8) and the condition of the portable electronic communication device 800 violates a predetermined safety condition, the software application will limit functionality of the portable electronic device 800.

In an alternative embodiment (e.g., described in FIGS. 5-6b), if the software application 812 determines that portable electronic communication device 800 has received an activation signal from a transmission device and the condition of the portable electronic communication device 800 violates a predetermined safety condition, but that the portable electronic communication device 800 is not a driver, it may not limit functionality. In such an alternative embodiment, if the software application 812 determines that the portable electronic communication device 800 has not received an activation signal from a transmission device but that the condition of the portable electronic communication device 800 does violate a predetermined safety condition, then the software application may limit functionality of the portable electronic device 800. Such an embodiment may protect from a driver removing a transmission device from a vehicle.

In one embodiment, the control software application 812 may be sent electronically to the portable electronic communication device. For example, the control software application 812, can be downloaded to a portable electronic communication device via email or text message and may be executed upon confirmation from the portable electronic communication device.

It will be appreciated that the phrase limiting functionality may encompass a broad range of limitations and that the inventor has anticipated a wide range of such limitations that may be placed on a portable electronic communication device as described in the non-limiting embodiments below. For example, in one embodiment, limiting functionality may comprise disabling one or more parts of a user interface (e.g., a graphical interface or a keypad). In an alternative embodiment, limiting functionality may comprise blocking the ability to send outgoing or receive incoming text message and data transmissions. In additional alternative embodiments, limiting the functionality may comprise but is not limited to one or more of the following: muting a portable communication device microphone, turning a portable communication device speaker off, disabling keyboard functionality, disabling graphical interface functionality, disabling transmission, etc. In one alternative embodiment, limiting functionality may comprise limiting the use of voice and data communication to hand free accessories. In another alternative embodiment, limiting functionality may comprise limiting the access of data stored on a portable electronic communication device (e.g., playing a video previously stored to a PDA, playing a video game from a cell phone, etc.)

In an additional embodiment, a portable electronic communication device may also be configured to allow limited functionality when received from a user via a hands free accessory (e.g., a Bluetooth enabled headset). For example, a user may not be able to write a text message using a portable electronic communication device keypad but instead may be able to verbally "write" and send a text message by using a voice activated hands free accessory (e.g., a user can speak a text message into a hands free accessory, which a portable electronic communication device sends as a written text message) such as a Bluetooth headset.

In yet another alternative embodiment, limiting functionality comprises allowing communication using the portable electronic communication device to selective third parties. For example, limiting functionality may comprise exclusively allowing phone calls to an emergency service provider such as police, fire, or EMS phone numbers. In another embodiment, limiting functionality may comprise allowing phone calls and/or text messages to be sent to a parent or guardian.

In one embodiment, even though functionality is limited, incoming electronic communications (e.g., voicemail messages, text messages, etc.) may be received by a portable electronic communication device and stored on the portable electronic communication device without providing notice of the received communications to the user interface until full functionality is enabled. Such an embodiment would ensure that electronic communications are not lost by a user who has limited functionality (e.g., a user who drives into an area having no cell phone signal would not lose their messages when they stop their car but instead would receive them when they stop regardless of having no cell phone signal).

Furthermore, one or more conditions may be selective to limit the functionality. For example, the predetermined safety condition may comprise the velocity or the location of a portable electronic communication device. In one embodiment, if the velocity of the portable electronic communication device is greater than 10 M.P.H. then functionality (e.g., data reception/transmission or voice reception/transmission capabilities) of the portable electronic communication device is limited. In an alternative embodiment, if the portable electronic communication device is located in an active school zone, functionality is limited. In yet another embodiment, if the portable electronic communication device is located in an active school zone and if the velocity of the portable electronic communication device is greater than a certain velocity then functionality is limited. It will be appreciated that alternative conditions or combinations of conditions may also be applied to the method and structure provided herein.

In another embodiment, a control software application running on a portable electronic communication device may be configured to limit communication device functionality for a period of time which extends beyond that of which the portable electronic communication device is both within a certain spatial boundary and violating a predetermined safety condition. In one such embodiment a control software application may limit functionality of a portable electronic communication device unless the device's velocity is less than a certain value for an extended period of time (e.g., greater than 10 seconds). Such an embodiment may prevent a portable electronic communication device from constantly switching between limited and full functionality while a driver is in stop and go traffic.

Figure 9:
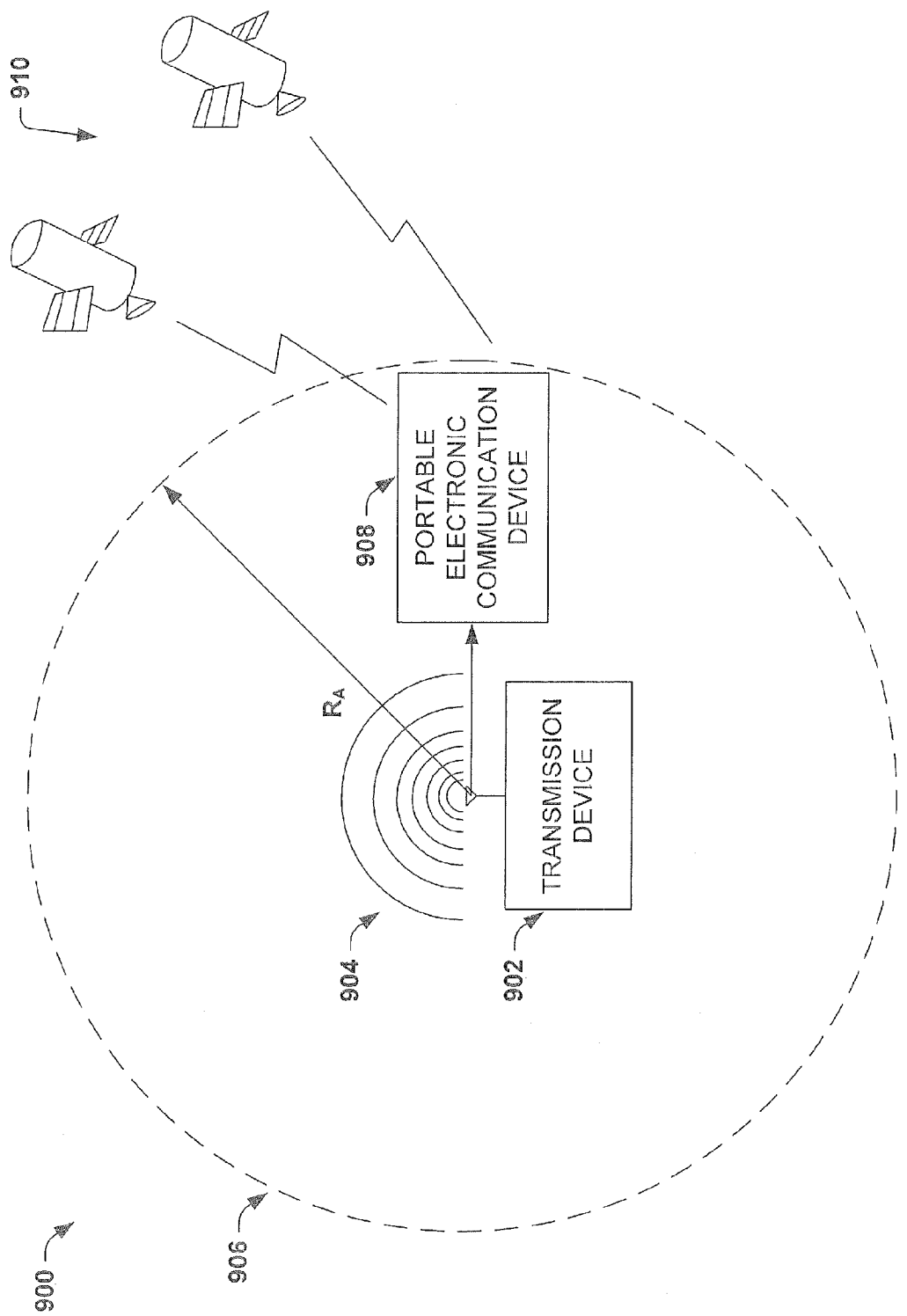
FIG. 9 illustrates a block diagram of the communication system provided herein, wherein the portable electronic communication device is configured to receive condition information from a plurality of global positioning satellites.

FIG. 9 illustrates an embodiment of a communication system 900, as provided herein, wherein a condition (e.g., velocity, location, etc.) is provided to a portable electronic communication device 908 by an array of global positioning system (GPS) satellites 910. As one skilled in the art would appreciate, GPS satellites 910 comprise medium Earth orbit satellites that transmit precise microwave signals enabling a GPS receiver to determine its location, speed, and direction at a particular time. The capacity to determine relative movement enables the portable electronic communication device 908 to calculate local velocity and orientation and therefrom to determine if a predetermined safety condition has been violated.

Figure 10:
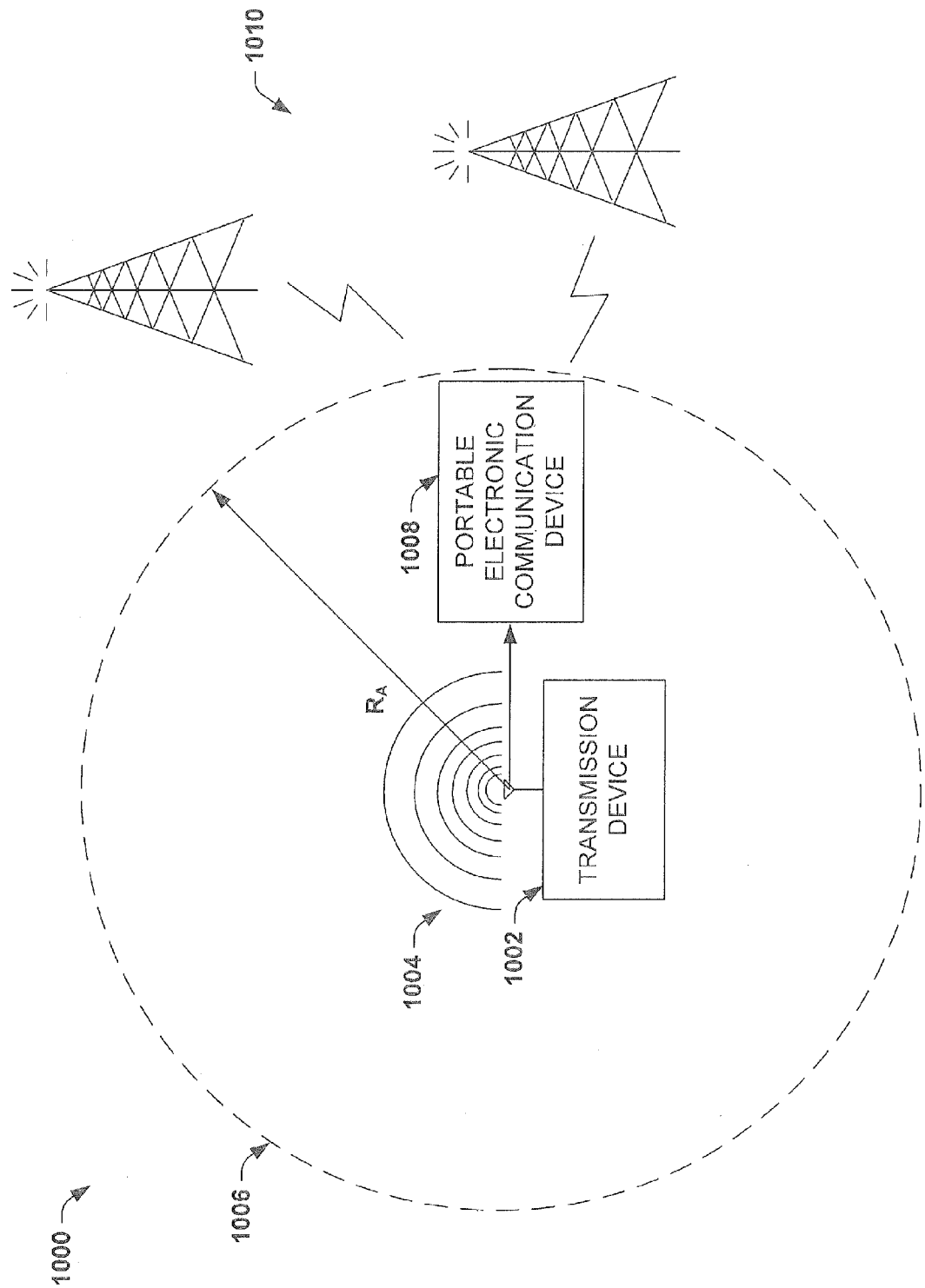
FIG. 10 illustrates a block diagram of the communication system provided herein, wherein the portable electronic communication device is configured to receive condition information using triangulation.

FIG. 10 illustrates an alternative embodiment of a communication system 1000, as provided herein, wherein a condition is provided to the portable electronic communication device 1008 by ground based transmission towers 1010. The transmission towers 1010 may be used to find the location or speed of a portable electronic communication device 1008 through triangulation (i.e., calculating the length of one side of a triangle, given measurements of angles and sides of the triangle formed by that point and two other known reference points, using the law of sines).

FIGS. 11-14 illustrate flow charts describing methods relating to the limitation of a portable electronic communication device functionality as provided herein. While methods 1100-1400 are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 11:
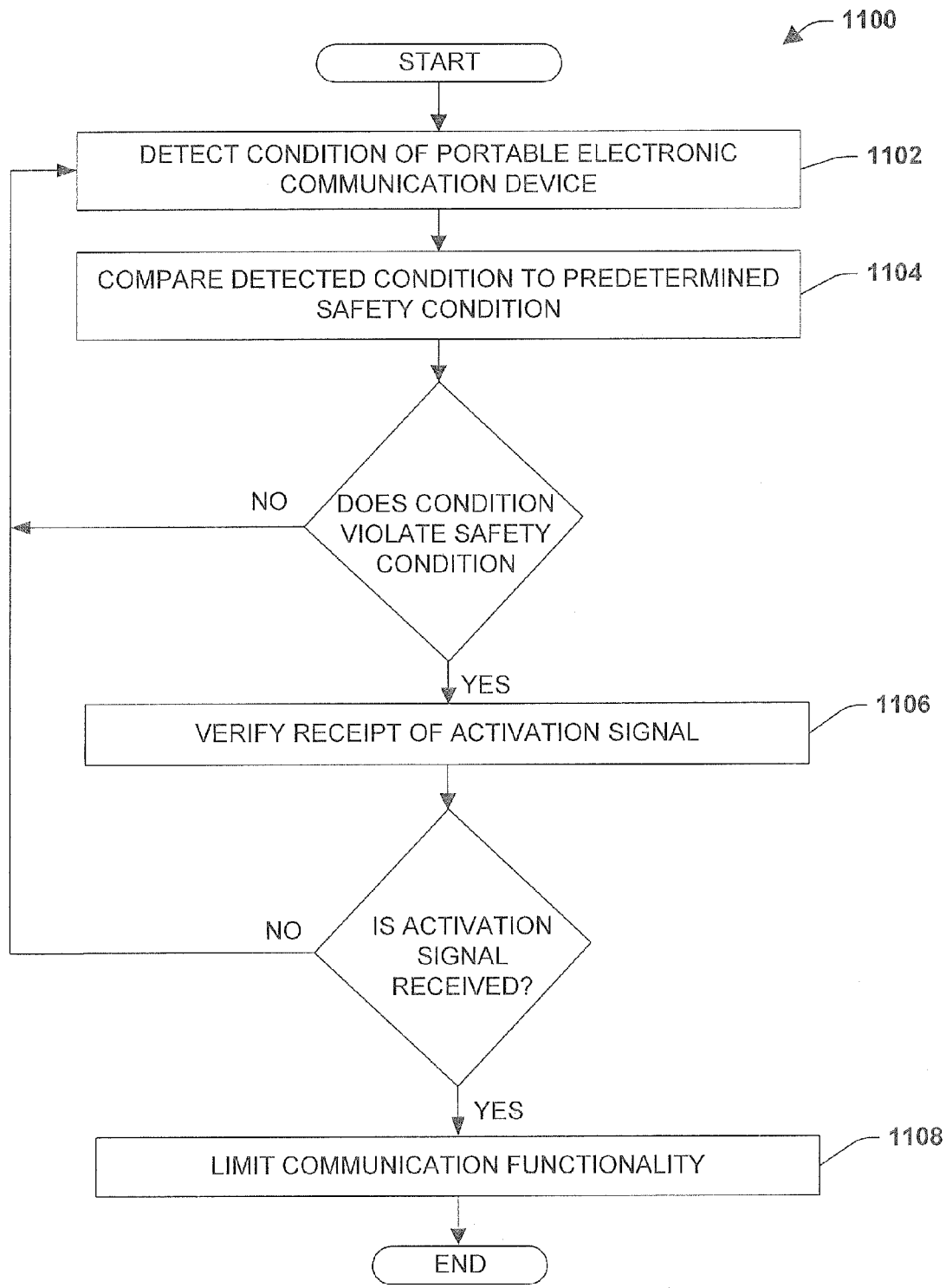
FIG. 11 is a flow chart illustrating a method for selectively limiting operation of a portable electronic communication device.

FIG. 11 is a flow chart illustrating an embodiment of a method for selectively limiting operation of a portable electronic communication device, wherein an activation signal may indicate that portable electronic communication devices that violate the predetermined safety condition and that are within the activation radius should have a limited functionality.

At 1102 a condition of a portable electronic communication device is detected. In one embodiment, the condition may comprise a velocity of the portable electronic communication device. In an alternative embodiment, the condition may comprise a location of a portable electronic communication device. The condition may be determined from signals received from a source external to the portable electronic communication device. For example, in one embodiment the condition is determined from signals received from one or more GPS satellites. In an alternative embodiment, the condition may be determined from ground based signals received from cell phone communication towers.

The detected condition is compared to a predetermined safety condition at 1104. The predetermined safety condition may comprise a specific velocity or location of the portable electronic communication device. In one embodiment, if the velocity of the portable electronic communication device is greater than 10 M.P.H. then functionality (e.g., data reception/transmission or voice reception/transmission capabilities) of the portable electronic communication device is limited. In an alternative embodiment, if the portable electronic communication device is located in an active school zone, communication is limited. In yet another embodiment, if the portable electronic communication device is located in an active school zone and if the velocity of the portable electronic communication device is greater than a certain velocity then functionality is limited. It will be appreciated that alternative conditions or combinations of conditions may also be applied to the method and structure provided herein.

If the detected condition violates a predetermined safety condition, verification of a reception of an activation signal is performed at 1106. Verification of a reception of an activation signal comprises determining if the portable electronic communication device is within a certain radius of a transmission device emitting an activation signal. In one embodiment, the portable electronic communication device may be configured to identify a received RFID signal (e.g., identify an identification code encoded in a received RFID signal) and/or to measure the field strength of an RFID signal having a specific encoding (e.g., using an RFID receiver located within the portable electronic communication device). For example, if the field strength of the RFID signal is above a predetermined threshold the portable electronic communication device will consider the activation signal received.

In alternative embodiments, the portable electronic communication device may be configured to identify a received signal and/or ascertain the strength of a received Bluetooth signal or a signal utilizing a zigbee specification to determine if an activation signal is received (i.e., if the phone is within the communication limiting radius or outside of a communication limiting radius).

If receipt of an activation signal is verified, functionality is limited at 1108. As stated above, limiting functionality may comprise a broad range of limitations including disabling one or more parts of a user interface (e.g., a graphical interface or a keypad), blocking the ability to send outgoing or receive incoming text message and data transmissions, limiting the use of voice and data communication to hand free accessories, allowing limited functionality when received from a user via a hands free accessory (e.g., a Bluetooth enabled headset), etc.

One skilled in the art will appreciated that the according to the method provided herein, the order of acts 1102 through 1106 may be different than shown in FIG. 11. For example, in one alternative embodiment, a portable electronic communication device may determine whether or not an activation signal is received (e.g., act 1106) prior to determining whether or not a condition of the portable electronic communication device violates a predetermined safety condition (e.g., act 1104). In another alternative embodiment, a portable electronic communication device may concurrently or simultaneously perform acts 1102 through 1106.

It will be further appreciated that the time at which acts 1102 through 1106 are performed may be the substantially the same or different and may vary in occur at one or more varying time intervals in different embodiments. For example, in one embodiment, the condition of a portable electronic communication device may be detected every x seconds (e.g., x=1 s, 2 s, 5 s, etc.), while verification of receipt of an activation signal may be performed every y ms (e.g., y=100 ms, 500 ms, 1000 ms, etc.). In another embodiment one embodiment, both the condition of a portable electronic communication device and verification of receipt of an activation signal may be performed every x seconds (e.g., x=0.1 s, 0.5 s, etc.).

Furthermore, the acts of FIG. 11 may be performed regardless of whether a portable electronic communication device is in a condition of limited or full functionality. For example, in one embodiment, when a portable electronic communication device has full functionality, it will perform method 1100 to determine whether or not functionality should be limited. In the same embodiment, when the portable electronic communication device has limited functionality, it will perform method 1100 to determine whether or not functionality should be restored to full functionality (e.g., if the conditions of both acts 1104 and 1106 are no longer met) or whether functionality should remain limited (e.g., if the conditions of both acts 1104 and 1106 are still met).

In one embodiment, functionality of a portable electronic communication device is limited for an extended period of time which increases beyond that of which the portable electronic communication device is both within a certain spatial boundary and violating a predetermined safety condition. In one such embodiment functionality of a portable electronic communication device is limited unless the device's velocity is less than a certain value for an extended period of time (e.g., greater than 10 seconds).

In another embodiment, if functionality is limited (e.g., 1108), incoming electronic communications (e.g., voicemail messages, text messages, etc.) may be received by a portable electronic communication device and stored on the portable electronic communication device without providing notice of the received communications to the user interface until full functionality is enabled. Such an embodiment would ensure that electronic communications are not lost by a user who has limited functionality (e.g., a user who drives into an area having no cell phone signal would not lose their messages when they stop their car but instead would receive them when they stop regardless of having no cell phone signal).

Figure 12:
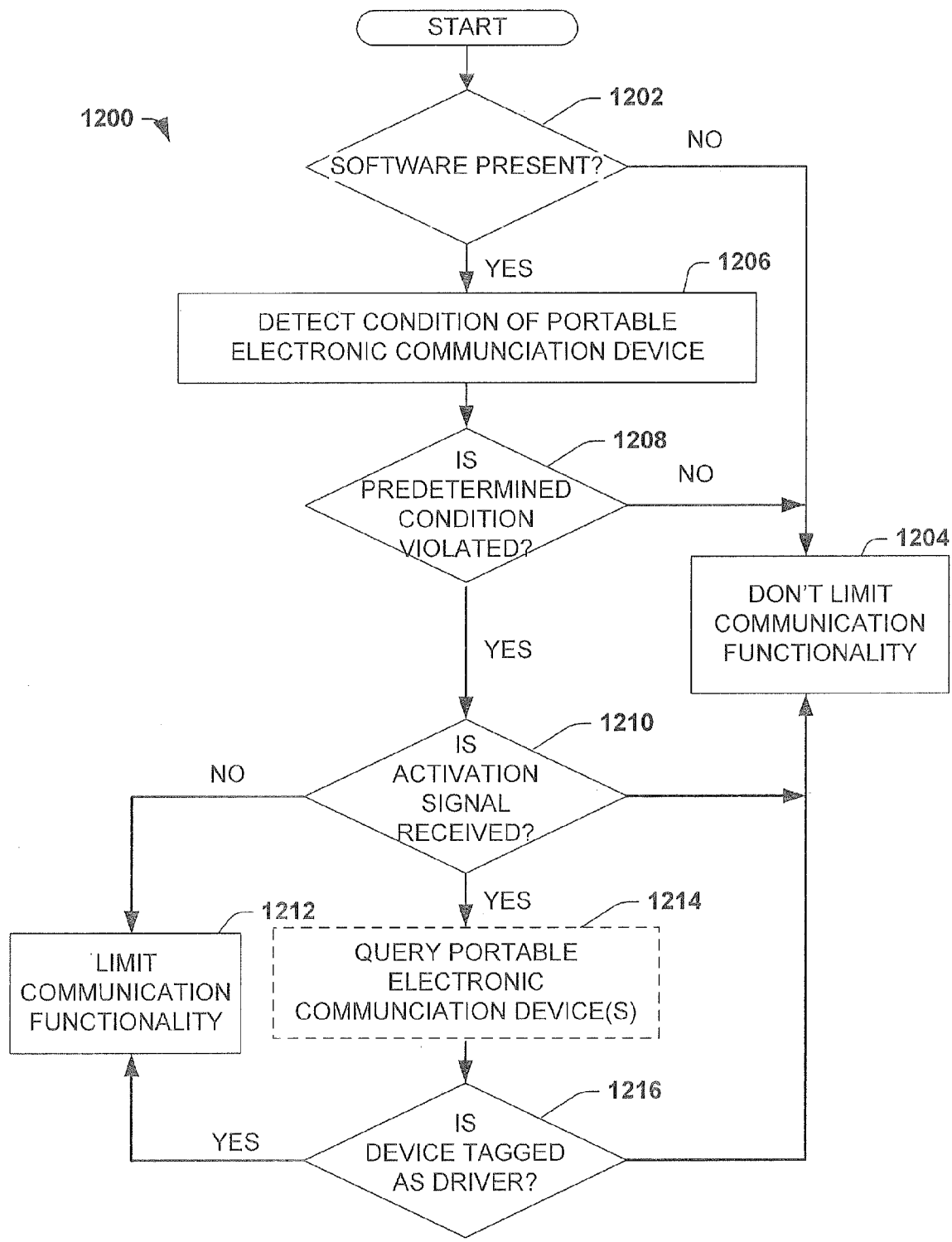
FIG. 12 is a flow chart illustrating an alternative method for selectively limiting operation of a portable electronic communication device.

FIG. 12 is a flow chart illustrating an alternative embodiment of a method for selectively limiting operation of a portable electronic communication device, wherein activation signal may indicate that portable electronic communication devices that violate the predetermined safety condition and that are within the activation radius may have a limited functionality if they are identified as a primary user and may further indicate that portable electronic communication devices that violate the predetermined safety condition and that are within the activation radius may not have a limited functionality if they are not identified as a vehicle operator (e.g., driver).

At 1202 the portable electronic communication device determines if functionality limiting control software is present. If the control software is not present then functionality of the portable electronic communication device will not be limited at 1204.

At 1206 a condition of a portable electronic communication device is detected. This step is described in greater detail supra in method 1100.

The detected condition is compared to a predetermined safety condition at 1208. If the condition of a portable electronic communication device does not violate a predetermined safety condition then functionality of the portable electronic communication device will not be limited at 1204.

At 1210, the portable electronic communication device determines if a transmission signal has been received. If a transmission signal has not been received the portable electronic communication device may limit functionality at 1212, in one embodiment.

At 1214, the portable electronic communication device determines if the driver has been identified. The portable electronic communication device may determine if the driver has been identified from the received transmission signal, which may indicate whether or not a driver has been identified. If a single portable electronic communication device is present in the activation radius then the driver will automatically be identified as the device present and the method will proceed to 1218.

If a driver has not been identified and there are multiple portable electronic communication devices present in the activation radius the transmission device may query the devices to ask which portable electronic communication device belongs to the driver. If a driver is identified, the transmission device will store the ID of the driver and may transmit the ID out as part of the transmission signal. Once the driver has answered the transmission signal will identify the driver and the method will proceed to 1218.

At 1218, the portable electronic communication device portable electronic communication device determines whether or not the transmission signal indicates that it is the driver (i.e., whether the transmission signal will indicate if a phone has been identified as the driver). If the transmission signal indicates it is the driver, by transmitting an ID associated with the portable electronic communication device, for example, the portable electronic communication device will limit its functionality. If the transmission signal does not indicate that it is the driver, the portable electronic communication device will not limit its functionality.

Therefore, method 1200 provides that when one portable electronic communication device is declared a driver, other phones will know that they are not the driver and will not have limited functionality.

Figure 13:
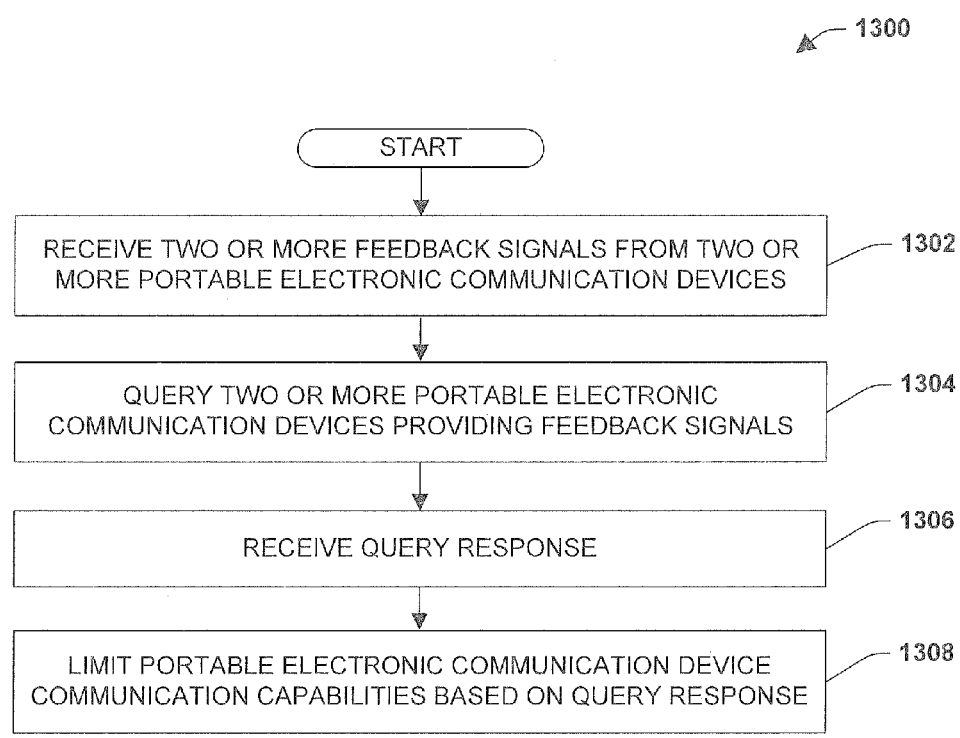
FIG. 13 illustrates a method for limiting the functionality of multiple portable electronic communication devices within an activation radius.

In a more detailed embodiment, (illustrated in FIG. 13), wherein multiple portable communication devices are located within an activation radius, the number of portable communication devices having a limited functionality is limited to a subset of the portable communication devices receiving the activation signal. FIG. 13 illustrates a method for limiting the functionality of multiple portable electronic communication devices within an activation radius.

At 1302 two or more feedback confirmation signals may be received from two or more portable electronic communication devices that have received the activation signal. In one embodiment, if movement of a vehicle is greater than a predetermined speed (e.g., 10 mph) before an operator is declared, the functionality may be disabled for all portable electronic communication devices within the activation radius until an operator is declared.

The portable electronic communication devices, providing the confirmation signals, may be queried at 1304. The query may be sent to the portable electronic communication devices within an activation radius to determine which device is operated by a vehicle driver. In one embodiment, the query may be sent via text message.

At 1306, a query response is received by the transmission device from the portable electronic communication devices At 1308, the response may be used to limit functionality of a subset the portable electronic communication devices. In one embodiment, wherein a single phone is identified as a driver, the functionality of the driver's portable electronic communication device is limited without limiting the functionality of portable electronic communication devices belonging to other passengers (e.g., other portable electronic communication devices that were not tagged as a driver).

Figure 14:
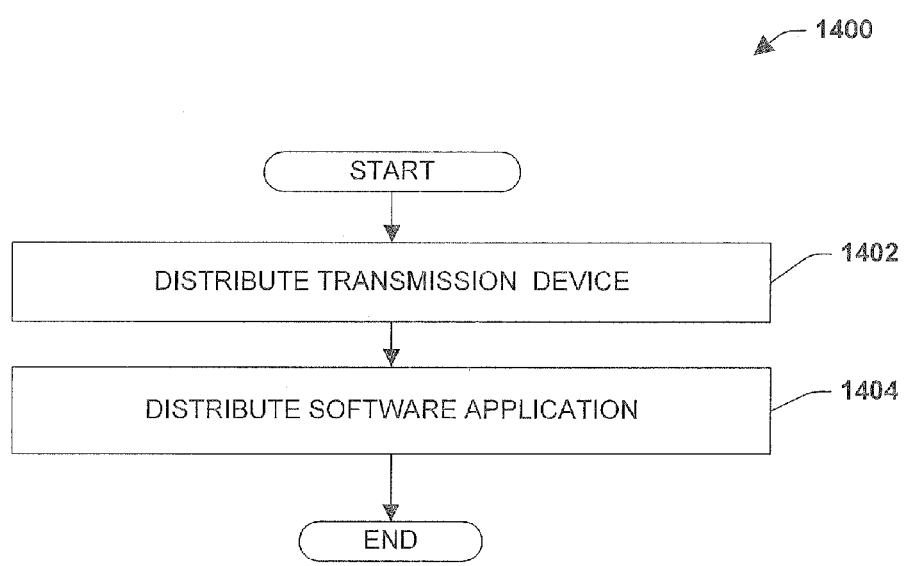
FIG. 14 is a flow chart illustrating a distribution method for limiting functionality of electronic communication devices.

FIG. 14 is a flow chart illustrating a distribution method for limiting functionality of electronic communication devices. The method comprises distributing a transmission device and associated control software application to a user.

At 1402 a transmission device is distributed to a user. In one embodiment, the transmission device may be sold to the user from the store of a cell phone provider. In an alternative device the transmission device sold online or over the phone and mailed to the user through the mail. The transmission device is configured to transmit an activation signal within an activation radius (e.g., defined by a signal strength of the transmission device) which provides for a communication limiting spatial boundary or cocoon.

At 1404 a control software application is distributed to the user. In one embodiment, the software application may be downloaded onto a portable electronic communication device of the user as a data communication (e.g., over the World Wide Web, over a proprietary software distribution program of a portable electronic communication device, etc.). The software application is configured to work in conjunction the user's portable electronic communication device and the transmission device to disable a functionality of the portable electronic communication device if the portable electronic communication device violates a predetermined safety condition and if the portable electronic communication device is within the activation radius.

Also, equivalent alterations and/or modifications may occur to those skilled in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein. Further, some regions that are illustrated as having distinct or abrupt edges may not be so precisely delineated, but may instead blend slightly with other regions. This is particularly true of doped or implanted regions that may diffuse with other regions, particularly at abutting edges.

What is claimed is:

1. A transmission device configured to selectively limit operation of a portable electronic communication device, comprising:
   a transceiver selectively coupled to a power supply, wherein upon being coupled to the power supply the transmission device is configured to transmit an activation signal that communicates with a portable electronic communication device, wherein the portable electronic communication device is configured to execute a control software application that limits functionality if a detected condition of the portable electronic communication device violates a predetermined safety condition and if the activation signal indicates that the portable electronic communication device should have a limited functionality; and
   one or more motion sensors configured to detect physical activity of a vehicle, wherein upon detecting physical activity of the vehicle, the one or more motion sensors couple the power supply to the transceiver.

2. The device of claim 1, wherein the activation signal indicates that the portable electronic communication device should have a limited functionality if the portable electronic communication device is located within an activation radius of the activation signal.

3. The device of claim 2, wherein the activation signal indicates that the portable electronic communication device should have a limited functionality if the portable electronic communication device is located within an activation radius of the activation signal and is identified by the activation signal as a vehicle operator.

4. The device of claim 3, wherein the activation signal is configured to not limit functionality of portable electronic communication devices located within the activation radius and not identified by the activation signal as the vehicle operator.

5. The device of claim 3, wherein the power supply comprises a battery configured to provide power to the transceiver to enable transmission of the activation signal.

6. The device of claim 3, further comprising an adhesive surface configured to affix the transmission device to a surface of the vehicle.

7. The device of claim 3, wherein:
   the transceiver is further configured to receive two or more confirmation signals from two or more portable electronic communication devices that are within the activation radius;
   wherein upon reception of the two or more confirmation signals, the transmission device is configure to query the portable electronic communication devices that provided the two or more confirmation signals to determine which portable electronic communication device is the vehicle operator.

8. The device of claim 7, wherein the transceiver is configured to accumulate data of portable electronic communication device identifiers to further assist in identifying the vehicle operator.

9. The device of claim 3, wherein the transmission device is configured to enter a power saving mode if the one or more motion sensors do not detect activity for a predetermined period of time; and wherein the transmission device is configured to exit the power saving mode if the one or more motion sensors detect activity of the vehicle.

10. The device of claim 3, further comprising one or more tamper resistance mechanisms configured to detect if the transmission device is being distressed;
   wherein when distress is sensed, a message is sent from the portable electronic communication device paired with the distressed transmission device to a managing authority to alert the managing authority that the transmission device has been distressed.

11. The device of claim 10, further comprising an adhesive surface configured to affix the transmission device to a surface of the vehicle,
   wherein the tamper resistance mechanisms comprise a capacitive component configured to discharge current to the transceiver when the transmission device is distressed.

12. The device of claim 3, wherein the transceiver is configured to communicate with multiple portable electronic communication devices within the activation radius.

13. The device of claim 1, wherein the transceiver is configured to receive a confirmation signal from the portable electronic communication device that identifies the portable electronic device as an operator of a vehicle.

14. The device of claim 13, wherein the transceiver is configured limit functionality of a plurality of portable electronic communication devices within an activation radius of the activation signal until the operator of the vehicle is identified.

15. A transmission device configured to selectively limit operation of a portable electronic communication device, comprising:
   a transmission device housing;
   a battery comprised within the transmission device housing and configured to provide power;
   a transceiver comprised within the transmission device housing and selectively coupled to the battery, wherein upon being coupled to the battery the transceiver is configured to transmit an activation signal that communicates with a portable electronic communication device, wherein the portable electronic communication device is configured to execute a control software application that limits functionality if a detected condition of the portable electronic communication device violates a predetermined safety condition and if the activation signal indicates that the portable electronic communication device should have a limited functionality; and
   a receiver configured to receive two or more confirmation signals from two or more portable electronic communication devices that are within an activation radius of the activation signal;
   wherein upon reception of the two or more confirmation signals, the transmission device is configured to query the portable electronic communication devices that provided the two or more confirmation signals to determine which portable electronic communication device is a vehicle operator.

16. The device of claim 15, further comprising one or more tamper resistance mechanisms configured to detect if the transmission device is being distressed; and
   wherein when distress is sensed, a message is sent from the portable electronic communication device paired with the distressed transmission device to a managing authority to alert the managing authority that the transmission device has been distressed.

17. The device of claim 15, wherein the portable electronic communication device is configured to execute a control software application that limits functionality if the portable electronic communication device is located within an activation radius of the activation signal and is identified by the activation signal as a vehicle operator.

18. A transmission device configured to selectively limit operation of a portable electronic communication device, comprising:
   a transceiver selectively coupled to a power supply, wherein upon being coupled to the power supply the transceiver is configured to transmit an activation signal that communicates with a portable electronic communication device, wherein the portable electronic communication device is configured to execute a control software application that limits functionality if a detected condition of the portable electronic communication device violates a predetermined safety condition and if the activation signal indicates that the portable electronic communication device should have a limited functionality; and
   one or more motion sensors configured to detect physical activity of a vehicle, wherein upon detecting physical activity of the vehicle, the one or more motion sensors are configured to couple a battery to the transceiver to provide power to the transceiver to generate the activation signal;
   wherein the transceiver is configured to communicate with multiple portable electronic communication devices within an activation radius of the activation signal.

* * * * *